US006226647B1

(12) United States Patent
Venkatasubramanian et al.

(10) Patent No.: US 6,226,647 B1
(45) Date of Patent: May 1, 2001

(54) METHOD, ARTICLE OF MANUFACTURE, AND APPARATUS FOR CONSTRUCTING A MULTI-DIMENSIONAL VIEW CONTAINING TWO-PASS VALUE MEASURE RESULTS

(75) Inventors: Raghuram Venkatasubramanian, Hayward; Jeffrey Douglas, San Francisco; Randall Shoup, San Francisco; James Wolf, San Francisco, all of CA (US)

(73) Assignee: Oracle Corporation, Redwood City, CA (US)

( * ) Notice: Subject to any disclaimer, the term of this patent is extended or adjusted under 35 U.S.C. 154(b) by 0 days.

(21) Appl. No.: 09/122,031

(22) Filed: Jul. 24, 1998

(51) Int. Cl.⁷ ...................................................... G06F 17/30
(52) U.S. Cl. .............................. 707/102; 707/100; 707/3; 705/405
(58) Field of Search ................... 707/1, 5, 10, 100–104, 707/200–206, 503, 509; 345/334, 348; 347/102, 105, 106, 260; 370/521; 386/96, 105

(56) References Cited

U.S. PATENT DOCUMENTS 5,317,686 * 5/1994 Salas et al. ........................... 707/503
6,073,134 * 6/2000 Shoup et al. ........................ 707/100

* cited by examiner

*Primary Examiner*—Ruay Lian Ho
(74) *Attorney, Agent, or Firm*—Stattler Johansen & Adeli LLP

(57) ABSTRACT

A record management system provides for displaying a two-pass value measure result in a multi-dimensional view containing cells. The record management system identifies a set of cells in the multi-dimensional view. The set of cells includes all cells needed for determining the two-pass value measure result. The record management system determines a one-pass value for each cell in the set of cells. Based on the one-pass values, the record management system determines the two-pass value measure result.

38 Claims, 21 Drawing Sheets

| Query Map | |
|---|---|
| Query 1 | Year, Region, Product, Sales($) |

∼311

|  | 1995 | | | 1996 | | |
| --- | --- | --- | --- | --- | --- | --- |
|  | VCR | TV | Stereo | VCR | TV | Stereo |
| East | $30,000 | $40,000 | $30,000 | $20,000 | $60,000 | $20,000 |
| West | $50,000 | $25,000 | $25,000 | $40,000 | $50,000 | $10,000 |

Figure 1(a)

|  | 1995 | | | 1996 | | |
| --- | --- | --- | --- | --- | --- | --- |
|  | VCR | TV | Stereo | VCR | TV | Stereo |
| East | 30% | 40% | 30% | 20% | 60% | 20% |
| West | 50% | 25% | 25% | 40% | 50% | 10% |

Figure 1(b)

| MASTER TABLE | | | | | |
|---|---|---|---|---|---|
| Q#: R# | Year | Region | Product | Sales($) | |
| Q1: 1 | 1995 | East | VCR | $50,000 | $301_1$ |
| Q1: 2 | 1995 | East | TV | $50,000 | $301_2$ |
| Q1: 3 | 1995 | West | VCR | $40,000 | $301_3$ |
| Q1: 4 | 1995 | West | TV | $60,000 | $301_4$ |
| Q1: 5 | 1996 | East | VCR | $60,000 | $301_5$ |
| Q1: 6 | 1996 | East | TV | $20,000 | $301_6$ |
| Q1: 7 | 1996 | East | Stereo | $20,000 | $301_7$ |
| Q1: 8 | 1996 | West | VCR | $50,000 | $301_8$ |
| Q1: 9 | 1996 | West | TV | $25,000 | $301_9$ |
| Q1: 10 | 1996 | West | Stereo | $25,000 | $301_{10}$ |

Figure 7(a)

| Query Map | |
|---|---|
| Query 1 | Year, Region, Product, Sales($) |

| MASTER TABLE INDEX | | |
|---|---|---|
| Dimension | Dimension Value | Query: Records |
| Year | 1995 | Q1: 1-4 | $320_1$
| Year | 1996 | Q1: 5-10 | $320_2$
| Region | East | Q1: 1-2, 5-7 | $320_3$
| Region | West | Q1: 3-4, 8-10 | $320_4$
| Product | VCR | Q1: 1, 3, 5, 8 | $320_5$
| Product | TV | Q1: 2, 4, 6, 9 | $320_6$
| Product | Stereo | Q1: 7, 10 | $320_7$

Figure 7(c)

| | Group 1H | Group 2H | Group 3H | Group 4H | Group 5H ← 330 |
|---|---|---|---|---|---|
| Group 1V | $332_1$ | $332_2$ | $332_3$ | $332_4$ | $332_5$ |
| Group 2V | $332_6$ | $332_7$ | $332_8$ | $332_9$ | $332_{10}$ |

(331 points to top-left of table)

Figure 8

| 334 | 1995 | | 1996 | | | ← 333 |
|---|---|---|---|---|---|---|
| ↓ | VCR | TV | VCR | TV | Stereo | |
| East | $50,000 | $50,000 | $60,000 | $20,000 | $20,000 | |
| West | $40,000 | $60,000 | $50,000 | $25,000 | $25,000 | |

Figure 9

| 334 | 1995 | | 1996 | | | ← 333 |
|---|---|---|---|---|---|---|
| ↓ | VCR | TV | VCR | TV | Stereo | |
| East | 50% | 50% | 60% | 20% | 20% | |
| West | 40% | 60% | 50% | 25% | 25% | |

Figure 10

| | 1995 | | 1996 | | |
|---|---|---|---|---|---|
| | VCR | TV | VCR | TV | Stereo |
| East | 12.5% | 12.5% | 15% | 5% | 5% |
| West | 10% | 15% | 12.5% | 6.25% | 6.25% |

Figure 11

METHOD, ARTICLE OF MANUFACTURE, AND APPARATUS FOR CONSTRUCTING A MULTI-DIMENSIONAL VIEW CONTAINING TWO-PASS VALUE MEASURE RESULTS

BACKGROUND OF THE INVENTION

A. Field of the Invention

The present invention is directed toward the field of information systems. More particularly, the present invention is directed toward the multi-dimensional organization, generation, maintenance, and viewing of two-pass values.

B. Description of Related Art

When analyzing information it is often desirable to scrutinize data that is derived from the information being analyzed. For example, when analyzing sales revenues contributed by a number of divisions in a corporation, it is useful to know what percentage of the corporation's total sales revenue is contributed by each division. Such a percentage value is referred to as a two-pass value, while the underlying sales revenue figures are referred to as one-pass values.

A one-pass value is a measure result that is obtained by performing some type of processing operation on a set of data records. A two-pass value is a measure result that is derived from processing a set of one-pass values. Examples of two-pass values include relative percentages, relative rankings, and running totals of one-pass values.

A raw data record contains values that are classified as being either a measure value or a dimension value. The dimension values characterize the measure values, and the measure values contain data to be either quantitatively or qualitatively analyzed.

A multi-dimensional view provides an environment in which a set of data records can be analyzed. Such analysis is made possible by converting the data records' measure values into one-pass value measure results and two-pass value measure results. The measure results are then displayed, so that they are characterized by the data records' dimension values.

For example, a company may have sold video cassette recorders ("VCR"), televisions ("TV"), and stereos in 1995 and 1996 in both an Eastern region and a Western region of the United States. The sales revenue measure values representing the VCR, TV, and stereo sales may be characterized by a number of different dimensions. One possible set of dimensions includes a region dimension, year dimension, and product dimension.

FIG. 1(a) illustrates a multi-dimensional view 100 characterizing the company's sales with respect to the region, year, and product dimensions. The multi-dimensional view 100 is formed so that the cells 101 are filled with sales revenue measure results, which are obtained from a set of data records. Each axis 103, 104 in the view 100 is divided into sections that represent a set of dimension values. Each section on the horizontal axis 104 corresponds to a unique pair of a year dimension value and a product dimension value. Each section on the vertical axis 103 corresponds to a unique region dimension value.

Each cell 101 in the view 100 contains a sales revenue measure result indicating the sales revenue of a product in a particular year in a particular region. For example, the upper lefthand cell in the view 100 contains a measure result indicating that there were $30,000 of VCR sales in the Eastern region of the United States in 1995. The sales revenue measure results appearing in the cells 101 in FIG. 1(a) are one-pass values, because they have been directly derived by processing measure values in a set of data records.

FIG. 1(b) illustrates an alternate multi-dimensional view 110 in which the cells 111 are filled with percentages, which are two-pass value measure results. The sections of the horizontal axis 114 and vertical axis 113 in the view 110 in FIG. 1(b) are the same as for the view 100 in FIG. 1(a). The only difference is that the measure results in the cells 111 contain the percentage of sales revenue that is contributed by each product for a combination of a region and a year.

For example, the upper lefthand cell in the FIG. 1(b) view 110 indicates the percentage of Eastern sales revenue in 1995 that was attributable to VCR sales. This two-pass value measure result is 30%. The measure results in FIG. 1(b) are two-pass values, because they are calculated based on the one-pass value measure results in the view shown in FIG. 1(b).

The data records that are used as the ultimate basis for generating a multi-dimensional view are retrieved from a database or other source of records, such as a data file. Database management systems are employed to manage such databases. These systems provide for storing, accessing, and manipulating data records. Records can be extracted from a database management system by submitting a query to the system. In response to the query, the database management system searches the records in the database to identify and provide a set of records which correspond to the requirements set forth in the query.

One traditional method of preparing multi-dimensional views having two-pass value measure results is by using SQL statements. Through the use of SQL statements, a record management system submits queries to a database management system that will result in the receipt of data records containing two-pass value measure results. Such SQL statements request data records that include specified dimension values and measure values. These SQL statements also call for one-pass values to be derived from the requested data records and two-pass value measure results to be derived from the one-pass values. As a result, the two-pass value measure results for use in a multi-dimensional view are provided in response to the SQL statement query.

However, the computation time and memory resources required for calculating the two-pass value measure results using SQL statements is excessive. In order to account for many different possible multi-dimensional views, a great number of different two-pass value measure results are calculated. Such two-pass value measure results may include ranks and percentages for different multi-dimensional views that could possibly be formed from the retrieved data records. By calculating the two-pass value measure results for many possible views, some of the two-pass value measure results that are calculated will never be employed. Consequently, the time spent in calculating these measure results and the many resources used to store them were wasted.

Further, the use of SQL statements limits the number of possible multi-dimensional views of two-pass values that can be created from a set of retrieved data records. Since two-pass value measure results are all performed simultaneously with a query, no new two-pass value measure results can be obtained once the query in completed. For newly desired two-pass value measure results, an entirely new query must be performed, even if the information in the retrieved data records is sufficient for deriving the two-pass value measure results. This is undesirable, since the new query will cause delay and utilize additional memory resources. Such delay is unacceptable when operating in an on-line analytical processing (OLAP) environment.

Another traditional method for preparing multi-dimensional views having two-pass value measure results is to create a multi-dimensional record structure containing two-pass value measure results. However, this method suffers drawbacks that are similar to the SQL statement method described above.

FIG. 2 illustrates a traditional multi-dimensional record structure 90 characterizing the previously mentioned company's sales revenue percentages with respect to the region, year, and product dimensions. The record structure 90 is formed so that cells $91_{1-12}$ in the structure 90 are filled with sales revenue percentage measure results. The x-axis 92 of the structure 90 is sectioned into regions that correspond to a set of product dimension values (VCRs, TVs, and stereos). The y-axis 93 of the structure 90 is sectioned into regions that correspond to a set of region dimension values (East and West). The z-axis 94 of the structure 90 is sectioned into regions that correspond to a set of year dimension values (1995 and 1996).

Each sales revenue percentage in a cell $91_{1-12}$ is characterized by a combination of a product dimension value, region dimension value, and year dimension value. For example, the percentage in the front upper lef thand cell $91_1$ is characterized by the VCR product dimension value, East region dimension value, and 1995 year dimension value. Accordingly, the percentage measure result in cell $91_1$ indicates the percentage of East sales revenue in 1995 attributable to VCR sales.

In order to obtain a two-pass value measure result using the record structure method, a database query is performed and the resulting data records are used as a basis for calculating one-pass values and deriving two-pass value measure results from the one-pass values. Multi-dimensional views are then created by taking slices of the record structure 90 along planes in the record structure 90 that are perpendicular to a record structure axis 93, 94, and 92.

However, an entirely new record structure will have to be created, if a desired view is not within the limited number of available views in the existing structure or the two-pass value measure result to be viewed is not included in the existing structure. As a result, significant amount of time and memory resources are required to create a new structure, since the existing record structure cannot be augmented. Additionally, constructing a record structure containing all possible views and two-pass value measure results causes computer and memory resources to be unnecessarily spent on generating views that may never be displayed.

Accordingly, it is desirable to provide for the efficient use of both time and memory resources in the generation of multi-dimensional views containing two-pass value measure results. It is therefore desirable to provide for generating all possible two-pass value multi-dimensional views that are supported by a set of retrieved data records. It is also desirable for a two-pass value measure result to only be calculated when there is an actual request for a multi-dimensional view containing such a two-pass value measure result.

SUMMARY OF THE INVENTION

A record management system is provided for displaying a two-pass value measure result in a multi-dimensional view. The record management system makes efficient use of time and memory resources in the generation of two-pass value multi-dimensional views. All possible two-pass value multi-dimensional views for a set of retrieved data records can be generated by the record management system. Further, two-pass value measure results are only calculated when there is an actual request for a multi-dimensional view containing such two-pass value measure results.

In operation, the record management system identifies a set of cells in a multi-dimensional view containing cells. This set of cells includes all cells needed for determining a two-pass value measure result for a selected cell. The record management system determines a one-pass value for each cell in the set of cells. Based on these one-pass values, the record management system determines a two-pass value measure result for the selected cell.

BRIEF DESCRIPTION OF THE DRAWINGS

Further details of the present invention are explained with the help of the attached drawings in which:

FIG. 1(a) illustrates a multi-dimensional view containing one-pass value measure results.

FIG. 1(b) illustrates a multi-dimensional view containing two-pass value measure results.

FIG. 7(a) illustrates a state of the master table shown in FIG. 4 after the master table is updated to account for a response from a first query that is submitted by the record management system shown in FIG. 4.

FIG. 7(b) illustrates a state of the query map shown in FIG. 4 after the query map is updated to account for the first query.

FIG. 7(c) illustrates the state of the master table index shown in FIG. 4 after the master table index is updated to account for the first query.

FIG. 8 illustrates a layout mapping created by the record management system shown in FIG. 4.

FIG. 9 illustrates a multi-dimensional view that has been generated by the record management system shown in FIG. 4 to display one-pass measure value results.

FIG. 10 illustrates a multi-dimensional view that has been generated by the record management system shown in FIG. 4 to display two-pass value measure results in accordance with the present invention.

FIG. 11 illustrates a multi-dimensional view that has been generated by the record management system shown in FIG. 4 to display two-pass value measure results in accordance with the present invention.

DETAILED DESCRIPTION

A. Two-Pass Value Measure Results

Figure 2:
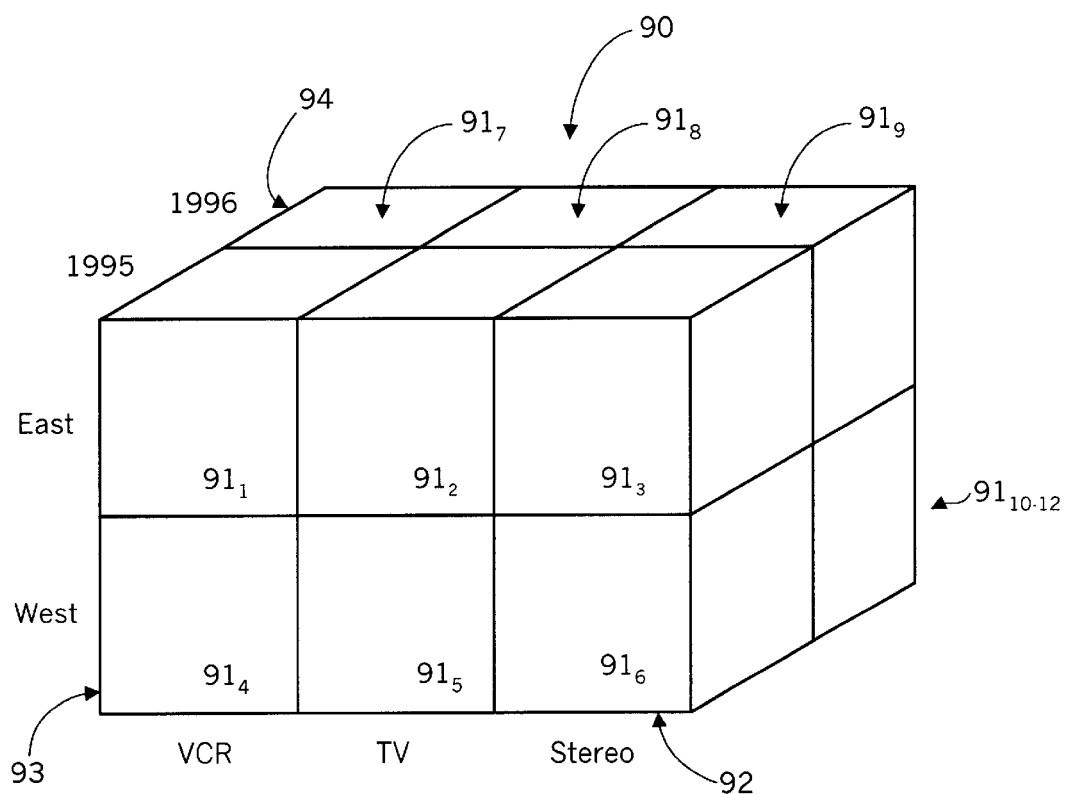
FIG. 2 illustrates a multi-dimensional record structure.
Figure 3:
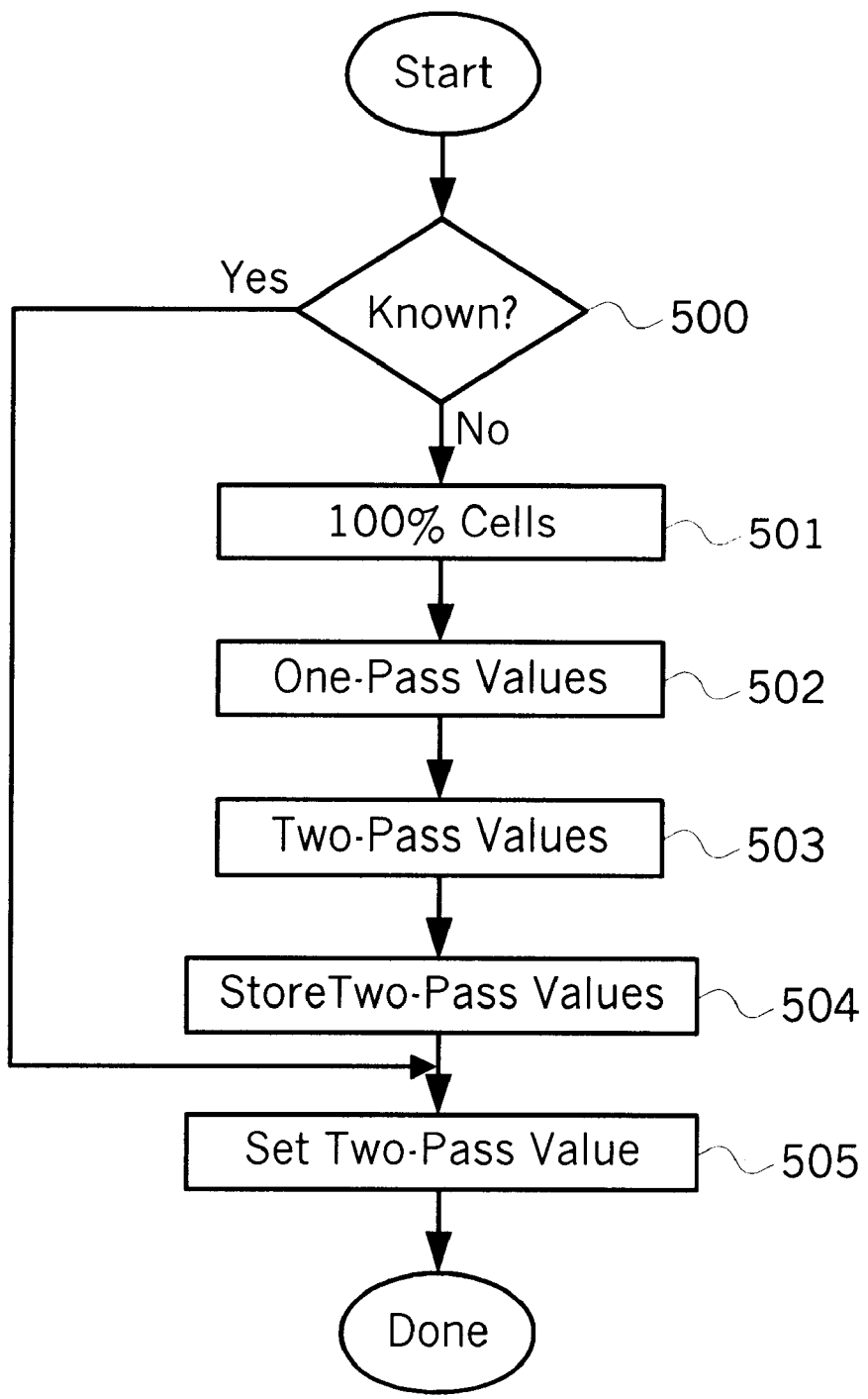
FIG. 3 illustrates a sequence of operations for determining a two-pass value measure result in accordance with the present invention.

FIG. 3 illustrates a sequence of operations for generating a two-pass value measure result for a cell in a multi-dimensional view in accordance with the present invention. The sequence of operations shown in FIG. 3 provides for efficient use of time and memory resources, by generating two-pass value measure results only when they are to actually be displayed in a multi-dimensional view. Further, the sequence of operations shown in FIG. 3 can be carried out for any hierarchical organization of dimensions in a multi-dimensional view.

In order to calculate two-pass value measure results, a two-pass value operation and a placement are specified. The two-pass value operation indicates the type of two-pass value measure results that are to be calculated, such as percentages or ranks. The placement identifies a placement dimension on each axis of the multi-dimensional view. The placement dimensions define the combinations of dimension values from each axis that define sets of 100% cells in that view. Each set of 100% cells includes all cells in the view that are needed for calculating a two-pass value measure result for a cell in the set of 100% cells.

For example, in the view 110 shown in FIG. 1(b) the two-pass value operation is percentages. The placement dimension for the vertical axis 113 is region, and the placement dimension for the horizontal axis 114 is year. Given such a designation, each set of 100% cells includes all cells corresponding to the combination of a year dimension value and region dimension value. For instance, the cells corresponding to the VCR, TV, and stereo products for the Eastern region in 1995 constitute a set of 100% cells.

Once the desired two-pass value operation and placement are specified for a multi-dimensional view, the sequence of operations shown in FIG. 3 is initiated for a selected cell. First, a determination is made, in step 500, of whether a two-pass value measure result for the selected cell is already known. If a two-pass value measure result is already known, the two-pass value measure result for the cell is set in step 505. Otherwise, a set of 100% cells is identified in step 501.

In identifying a set of 100% cells, a determination is made of the one-pass values that must be obtained in order to calculate the two-pass value measure result for the selected cell. Such a determination is made by identifying all of the cells in the view that correspond to the same placement dimension value on each view axis, as the cell for which the two-pass value measure result is being determined.

The step of identifying a set of 100% cells in response to a specified placement enables two-pass value measure results to be calculated for any measure characterization that is available in a set of data records. This contrasts with traditional methods for displaying two-pass value measure results. As described above, traditional methods only allow for predetermined characterizations to be employed. The capability to provide two-pass value measure results for any characterization also eliminates the undesirable need to anticipate and pre-calculate two-pass value measure results that may never be used.

Once a set of 100% cells is identified 501, a one-pass value is calculated for each of the 100% cells in step 502. In one embodiment of the present invention, the operation to be used in determining the one-pass values in dictated by the specified two-pass value operation. In an alternate embodiment of the present invention, the one-pass value operation is expressly specified.

In embodiments of the present invention, different methods can be employed for obtaining one-pass values. In one embodiment, the one-pass values are calculated by a multi-dimensional record management system as needed, based on a retrieved set of data records. A process for calculating one-step values in accordance with the present invention will be explained in greater detail below.

Once the one-pass values are calculated, they are employed in determining two-pass value measure results, in step 503, for each of the cells in the set of 100% cells. These newly determined two-pass value measure results are then stored in step 504, and the two-pass value measure result is set in step 505. The stored two-pass value measure results are employed for setting the two-pass value measure result for the selected cell in step 505. The stored two-pass value measure results are also employed for determining whether the two-pass value measure result for a selected cell is know (step 500).

By way of example, the sequence of operations shown in FIG. 3 is applied to determine a two-pass value measure result for a cell in the view 110 in FIG. 1(b). The selected cell is the upper lefthand corner cell, characterized by the 1995, VCR, and East dimension values. The placement and two-pass value operation are (year, region) and percentages, respectively.

Initially, it is determined (step 500) that a percentage value is not already known for the selected cell. Next, the determination of the set of 100% cells (step 501) identifies the selected cell, and the cells corresponding to TV and stereo products in 1995 in the East region. A calculation of one-pass values (step 502) for the 100% cells yields the following values found in view 110 in FIG. 1(b): $30,000 for the (East, 1995, VCR) cell, $40,000 for the (East, 1995, TV) cell, and $30,000 for the (East, 1995, Stereo) cell.

A percentage measure result is determined (step 503) for each of the 100% cells as follows: 1) divide the cell's one-pass value by the sum of all one-pass values in the set of 100% cells; and 2) multiply the resulting quotient by 100%. The resulting percentage measure results are stored (step 504), and the selected cell's percentage measure result is set (step 505).

When another cell in the identified set of 100% cells is selected, it will be determined (step 500) that the cell's percentage measure result is already known. This determination is made by reviewing the stored percentage measure results. The percentage measure result for such a cell will then be immediately set (step 505).

B. Multi-Dimensional Record Management System

Figure 4:
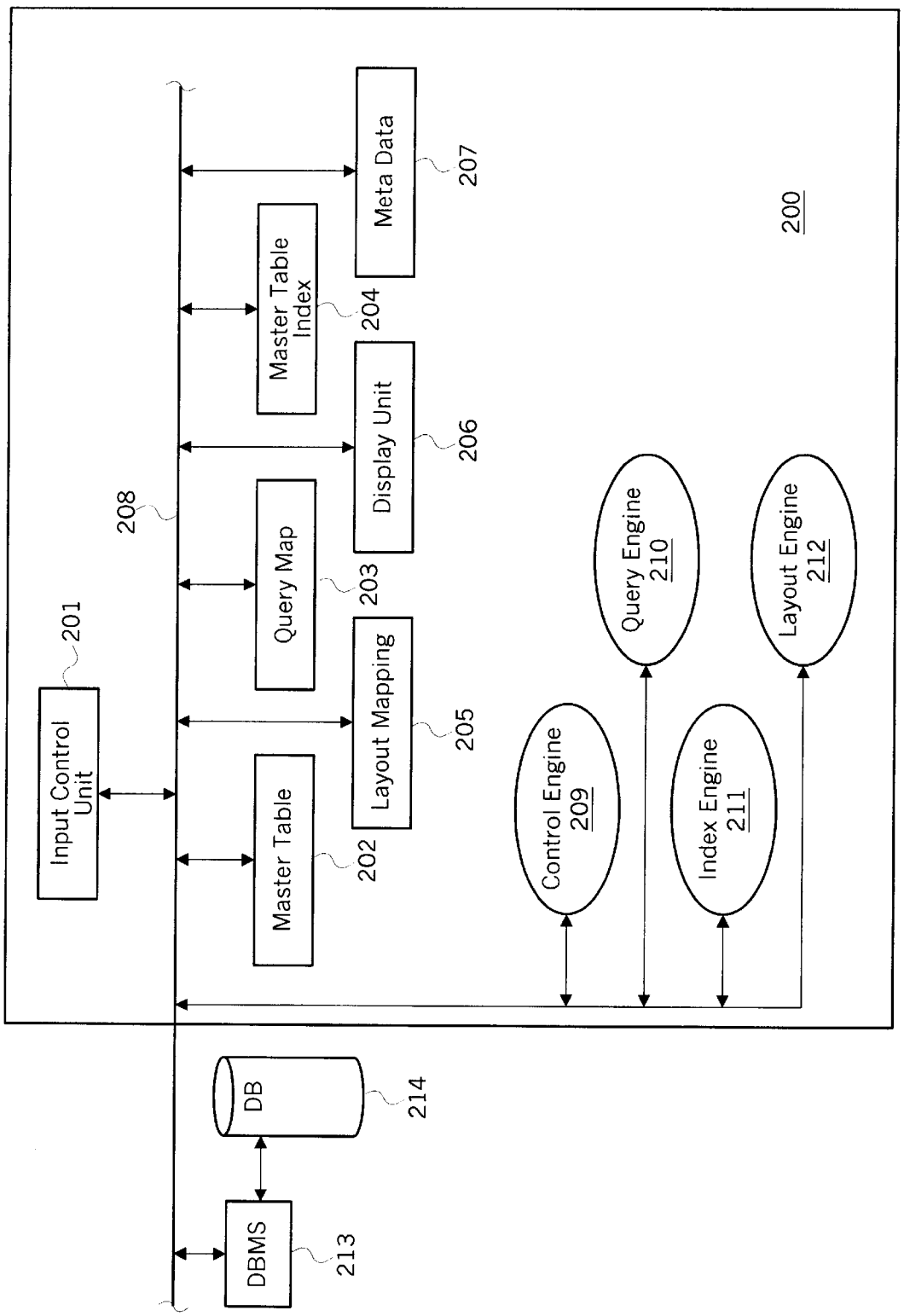
FIG. 4 illustrates a multi-dimensional record management system in accordance with the present invention.

FIG. 4 illustrates a multi-dimensional record management system 200 in accordance with the present invention. The record management system 200 provides for the generation of multi-dimensional views containing two-pass value measure results. In providing the two-pass value measure results, the record management system 200 efficiently utilizes both computation time and memory resources by employing a sequence of operations that correspond to the process shown in FIG. 3.

In operation, the record management system 200 generates a multi-dimensional record structure foundation. Utilizing this foundation, the record management system 200 is able to generate multi-dimensional views of measure values. By employing the record structure foundation, multi-dimensional views can be generated to include records that are retrieved using either a single query or multiple queries. Additionally, the record structure foundation can be augmented with records that are retrieved from additional queries made after the record structure foundation is initially formed. This avoids the need to build an entirely new record structure foundation when views are expanded to include records from new queries.

The record management system 200 shown in FIG. 4 includes a system bus 208 that couples together an input control unit 201, a set of data storage units 202, 203, 204, 205, 207, a display unit 206, and a set of processing engines 209, 210, 211, 212.

The data storage units include a master table storage unit 202, a query map storage unit 203, a master table index storage unit 204, a layout mapping storage unit 205, and a metadata storage unit 207. The processing engines include a control engine 209, a query engine 210, an index engine 211, and a layout engine 212. In an embodiment of the present invention, each processing engine is implemented by having a processor unit execute processor readable instructions stored in a computer readable medium, such as a memory. In one embodiment of the present invention, different processor units are employed for each engine. In an alternate embodiment of the present invention, a single processor unit is used to implement all of the engines or a set of the engines.

The record management system 200 is coupled to a database management system 213, which is linked to a database 214. The database 214 contains records that are to be used by the record management system 200 in providing multi-dimensional views. The database management system 213 extracts records from the database 214 in response to queries.

In one embodiment of the present invention, the system bus 208 is extended outside of the record management system 200 and coupled to the database management system 213. In an alternate embodiment of the present invention, the record management system 200 includes a communications peripheral (not shown) which couples the database management system 213 to the record management system 200. The communications peripheral couples the record management system 200 and the database management system 213 via a communications medium, such as a local area network, serial or parallel port interface, or another suitable communications medium.

The input control unit 201, control engine 209, and display unit 206 combine to provide a user interface. The input control unit 201 enables a user of the record management system 200 to provide instructions to the system 200 via an input device, such as a keyboard, mouse, trackball or other suitable mechanism. The display unit 206 provides for displaying information, such as multi-dimensional views and prompts for instructions. The control engine 209 controls the operation of the input control unit 201 and the display unit 201, as well as the transfer of information between the input control unit 201 and the rest of the system 200.

The master table storage unit 202 provides for maintaining records that are to be used by the record management system 200 in generating multi-dimensional views. The records maintained in the master table storage unit 202 can either be stored directly in the master table storage unit 202 or in a memory location (not shown) that is addressable based on a pointer that is stored in the master table 202.

The records being maintained by the master table 202 are records that have been retrieved from the database 214 via the database management system's response to a set of queries. In accordance with the present invention, a query calls for records that include values associated with a set of measures and values associated with a set of dimensions. The dimension values in a record characterize the measure values in the record. Query requirements are provided to the record management system 200 by the system's user. The user interface formed by the input control unit 201, control engine 209, and display unit 206 facilitate the retrieval of query requirements from a user. The query requirements are transferred to the query engine 210, which submits queries to the database management system 213.

In response to a query, the database management system 213 extracts records from the database 214 that conform to the measure and dimension requirements called for in the query. The database management system 213 then transfers the extracted records to the record management system 200. In the record management system 200, the query engine 210 receives the extracted records and transfers them to the master table 202 to be maintained. For each of the retrieved records, the master table 202 provides an indication of the query that yielded the record.

The query engine 210 also generates a record of the queries that have been submitted to the database management system 213. The record of queries is maintained in the query map storage unit 203. In the query map 203, each query that is submitted to the database management system 213 is recorded in a query map record. Each query map record identifies a query that has been submitted and the subject matter that was called for by the query. Accordingly, a query map record identifies a query and the dimensions and measures called for in the query.

In addition to creating the query map 203, the record management system 200 generates a master table index in storage unit 204. The master table index 204 contains dimension index records. Each dimension index record identifies the following: 1) a dimension value that is associated with one of the dimensions called for in the queries; 2) records in the master table 202 that contain the dimension value; and 3) the dimension associated with the dimension value.

The index engine 211 is responsible for generating and updating the master table index 204. After new records are placed in the master table 202 in response to a new query, the index engine 211 reviews each new record. If the index engine 211 encounters a dimension value that does not already have a corresponding index record, then a new dimension index record is created for the dimension value. If the index engine encounters a dimension value that already has a corresponding dimension index record, then the existing dimension index record is updated to account for the new record.

The query map 203 and master table index 204 combine to form the multi-dimensional record structure foundation. Once the query map 203 and master table index 204 are created, there is no need to build a traditional multi-dimensional record structure to obtain multi-dimensional views of the records in the master table 202. The record structure foundation enables records in the master table 202 to be identified and extracted for display in a user formatted multi-dimensional view.

Further, both the query map 203 and master table index 204 can be augmented to account for subsequent additional queries that provide records to the master table 202. In traditional multi-dimensional record structures, such augmentation is not possible.

For example, the record management system 200 is able to generate a first multi-dimensional view of records that are retrieved in response to a first query, once the query map 203 and master table index 204 are updated to account for the first query. Next, the record management system 200 can have a second query performed and update the query map 203 and master table index 204 to account for the second query. A second multi-dimensional view can then be generated using records retrieved in the first query and second query. This contrasts sharply with the traditional practice of only forming multi-dimensional views of records that are retrieved in response to a single query.

The layout engine 212 and layout mapping storage unit 205 are employed to generate a multi-dimensional view based on the data in the query map 203 and master table index 204. In order to generate a multi-dimensional view, the layout engine 212 creates an axis tree and a layout mapping of cells in the layout mapping storage unit 205. The layout engine 212 then converts the layout mapping into a view. The view is displayed to the record management system's user by the display unit 206.

A layout mapping is a shell for a view or portion of a view that is to be generated by the record management system 200. The layout mapping includes a set of cells that are organized to each correspond to different groupings of records from the master table. Each grouping of records characterizes a set of cells within the layout mapping.

The organization of the layout mapping is dictated by a user defined set of formatting information, which identifies the following: 1) measures that are to be represented in the layout mapping's cells; 2) the number of axes in the multi-dimensional view; 3) dimensions that are to be used to characterize the measures; 4) an assignment of specific dimensions to different axes in the view; and 5) operations to be performed in determining measure results to be placed in the cells for each measure. The layout engine 212 utilizes the user-defined formatting information and the information in the record structure foundation to generate the layout mapping. The generation of the layout mapping will be described in greater detail below.

An axis tree is a representation of the dimensions on each axis of a multi-dimensional view. For each axis in the view, an axis tree is prepared. The axis tree for each axis includes a set of axis nodes for each dimension on the axis. Each axis node corresponds to a dimension value and at least one group of data records that corresponds to a cell. For each group of records that corresponds to a cell, a chain of axis nodes is formed. Each axis node in the chain identifies the groups of records to which it corresponds and the other axis nodes to which it is chained.

For example, an axis tree for the horizontal axis 114 of the view 110 shown in FIG. 1(b) includes two sets of axis nodes. One set of axis nodes corresponds to the year dimension and one set of axis nodes corresponds to the product dimension. The axis nodes for the year dimension include a 1995 axis node and a 1996 axis node. The axis nodes for the product dimension include an axis node for each of the product dimension values in each of the years. The creation of an axis tree will be described in greater detail below.

Once the layout mapping and axis trees are generated, the layout engine 212 utilizes the information created in the generation of the layout mapping and axis tree, as well as the user's formatting information, to create a multi-dimensional view. The layout engine 212 generates an axis display for each axis of the view. Each axis display correlates a set of cells to a combination of dimension values. The layout engine 212 also determines which records in the master table 202 include measure values that are to be employed in generating the multi-dimensional view. The measure values in these records are then retrieved by the layout engine 212 and used to determine measure results. Each measure result is loaded into a corresponding cell in the layout mapping storage unit 205. Once the axis displays are formed and the cells are loaded, the display unit 206 displays the view that is provided from the converted layout mapping.

The metadata storage unit 207 contains information to assist the user of the record management system 200 in selecting a formatting for the multi-dimensional view. In accordance with the present invention, the metadata storage unit 207 contains information about the data in the database 214. Such information may include a list of dimensions represented in the database 214, hierarchical relationships between the dimensions, and measures that are represented in the database 214. The metadata 207 can also include a listing of the operations that the record management system 200 may be instructed to perform in determining measure results. Further information about the record management system 207 and database 214 may also be provided in the metadata 207.

When the record management system 200 has to collect view formatting information, the system 200 displays the metadata 207 to the user. This enables the user to be aware of the options that are available. The metadata 207 may also be displayed to the user when the system 200 is gathering query requirements from the user. When assembling a query or generating a multi-dimensional view, the record management system 200 operates in response to the user provided information and does not access the metadata.

C. Record Management System Operation

Figure 5A:
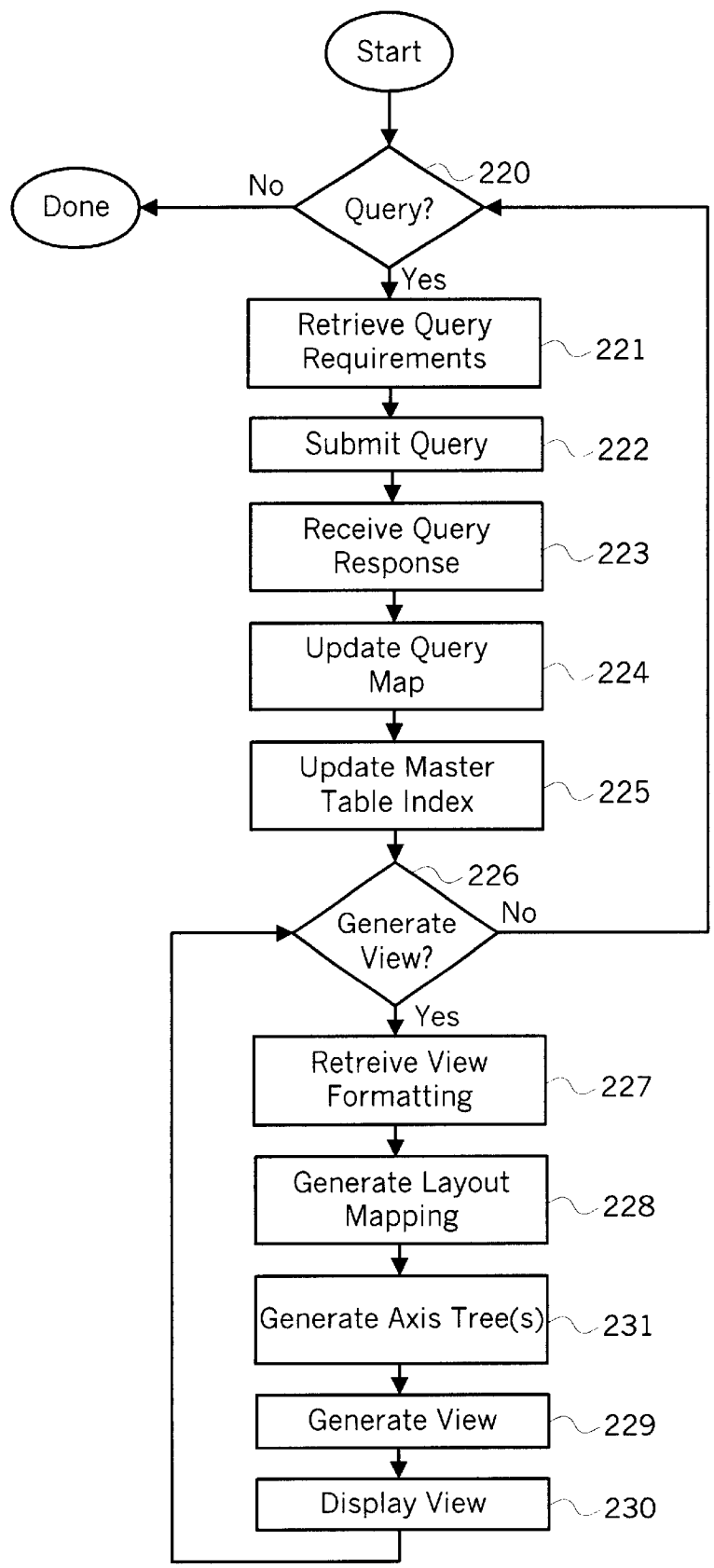
FIGS. 5(a)–5(l) illustrate a sequence of operations performed by the record management system shown in FIG. 4 to generate a multi-dimensional view in accordance with the present invention.

FIG. 5(a) illustrates a sequence of operations performed by the record management system 200 in accordance with the present invention to generate a multi-dimensional view of records. By way of non-limiting example, the sequence of operations will be described with reference to specific sets of queries and records. One with ordinary skill in the art will recognize that embodiments of the present invention may be employed with many different sets of queries and records.

1. Record Structure Foundation

When generating a multi-dimensional view, the record management system 200 determines, in step 220 (FIG. 5(a)), whether the record management system's user wishes to have a query performed. If no query is desired, the process of generating multi-dimensional views is completed. If a query is to be performed, the record management system 200 obtains an input from the user in step 221 that indicates the dimensions and measures that are to be called for by the query operation. The control engine 209 and input control unit 201 combine to collect this information from the user.

Once the desired measures and dimensions are retrieved, they are transferred to the query engine 210, which submits a query request to the database management system 213 in step 222. The query request instructs the database management system 213 to extract records from the database 214 that contain values associated with the dimensions and measures called for in the query request. The database management system 213 extracts such records from the database 214 and provides them to the record management system 200.

The query engine 210 receives the records provided by the database management system 213 and provides for them to be maintained in the master table 202 in step 223. Upon maintaining the records in the master table 202, an indication is provided in the master table 202 that identifies each of the newly entered records. This indication can be the address of the records in the master table, a query and record number that is entered in the master table, or another form of identifier.

For example, a user may wish to have a query performed in which records are retrieved that relate to the dollar value of product sales in different regions of the United States in different years. Accordingly, a corresponding query request is issued by the query engine 210 to the database management system 213 in step 222. The query request causes the database management system 213 to find and return records that include values associated with a year dimension, region dimension, product dimension, and dollar sales measure.

As shown in FIG. 7(a), the records $301_{1-10}$ that are returned by the database management system 213 are received by the query engine 210 and maintained in the master table 202 in step 223. In the master table 202 shown in FIG. 7(a), ten records $301_{1-10}$ are maintained from the database management system's response to the above-identified query. This query will be referred to as Query 1 ("Q1"). Each record $301_{1-10}$ includes the following: 1) a dimension value that is associated with a year dimension ("Year"); 2) a dimension value that is associated with a region dimension ("Region"); 3) a dimension value that is associated with a product dimension ("Product"); and 4) a measure value that is associated with a dollar sales measure ("Sales ($)"). Each record set is identified by its query number (Q#), which is Q1 in this case, and a record number (R#). 1995 and 1996 are dimension values associated with the year dimension. Video cassette recorder ("VCR"), television ("TV"), and stereo are dimension values associated with the product dimension, and East and West are dimension values associated with the region dimension. The dollar amount in each record $301_{1-10}$ is a measure value associated with the Sales ($) measure.

As shown in the records $301_{1-10}$ from Query 1, the database 214 contained dollar sales measure values for the years 1995 and 1996 in the East and West regions of the United States. Dollar sales measure values are available for video cassette recorders and televisions in each region in both 1995 and 1996, but dollar sales measure values are available for stereos only in 1996 in both the East region and West region. No dollar sales measure values for stereos exist for 1995.

In response to newly received records from a query, the record management system 200 updates the query map 203, in step 224 (FIG. 5(a)), so that it contains a record of the most recently performed query. The query map 203 is updated by the query engine 210 creating a record in the query map 203 that identifies the most recent query and each of the dimensions and measures that are called for in the most recent query.

For example, FIG. 7(b) shows a record 311 that is added to the query map 204 to correspond to Query 1. The query map record 311 that is added for Query 1 identifies Query 1 and lists each of the dimensions and measures that are called for in Query 1. Accordingly, the dimensions listed are Year, Region, and Product, and the measure listed is Sales ($).

In addition to updating the query map 203, the record management system 200 updates the master table index 204 in step 225 to account for the newly received records from a query. The index engine 211 is responsible for generating and updating index records in the master table index 204. The index engine 211 ensures that an updated dimension index record exists for each dimension value in a newly received set of records.

Each dimension index record identifies a dimension value and the records in the master table 202 that include the dimension value. Each dimension index record also preferably includes an indication of the query that provided each of the identified records. In further embodiments of the present invention, each dimension index record identifies a dimension that is associated with the dimension value in the index record.

For example, a newly received set of records from a query may have N different dimension values representing D dimensions throughout the records. Each of the N different dimension values is referenced by using the nomenclature "dimension_value$_n$", wherein n is an integer in a range of 1 to N and dimension_value$_n$ refers to a nth dimension value in the set of N dimension values. Additionally, the set of records may include measure values representing M measures throughout the records. The index engine 211 updates the master table index 204 to account for each of the N dimension values.

In updating the master table index 204 for one of the dimension values in the N dimension values, for example dimension_value$_n$, the index engine 211 identifies records in the newly received set of records that include the dimension_value$_n$. If the master table index 204 does not already include a dimension index record for the dimension_value$_n$, then the index engine 211 creates a new dimension index record for the dimension_value$_n$. If a dimension index record already exists for the dimension_value$_n$, then this dimension index record is updated to identify the records in the new set of records that include the dimension_value$_n$. The above-described process is performed N times with n being a different integer value in the range of 1 to N each time, wherein N is an integer. As a result, the master table index 204 is updated with respect to each of the N dimension values, namely dimension_value$_1$-dimension_value$_N$.

Figure 5B:
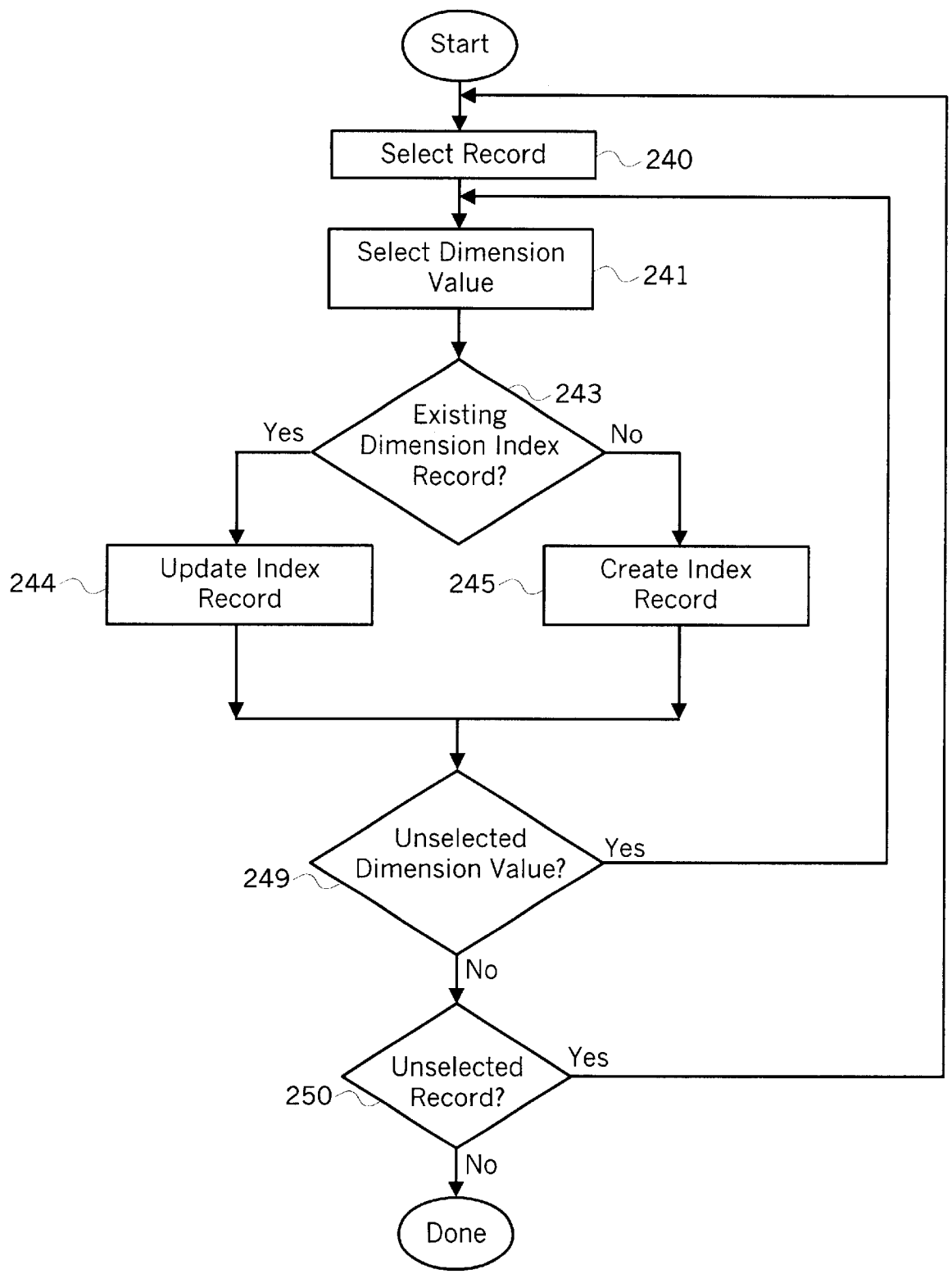

FIG. 5(b) illustrates a sequence of operations performed by the index engine 211 to update the master table index 204 in step 225 in response to a newly received set of records from a query. First, the index engine 211 selects a record in the newly received set of records in step 240. Next, the index engine 211 selects a dimension value in the selected record in step 241.

For the selected dimension value, the index engine 211 determines, in step 243, whether a corresponding dimension index record already exists in the master table index 204. If a corresponding dimension index record already exists for the dimension value, then the existing dimension index record is updated in step 244 to identify the selected record. Additionally, the existing dimension index record is updated to identify the query that produced the selected record. If a corresponding dimension index record does not exist for the dimension value, a new corresponding dimension index record is created in step 245. The new dimension index record identifies the dimension associated with the dimension value, the dimension value, the selected record, and the query that produced the selected record.

After a new dimension index record has been created (step 245) or an existing dimension index record has been updated (step 244) the index engine 211, in step 249, determines whether any dimension values in the selected record have not yet been selected. If any dimension value has not yet been selected, then the index engine 211 selects another dimension value from the selected record in step 241 and repeats the above-described operation. If all of the dimension values in the selected record have been selected, then the index engine 211, in step 250, determines whether any record in the newly received set of records has not yet been selected. If any record remains unselected, the index engine 211 selects a new record in step 240 and repeats the above-described process. Otherwise, the master table index 204 has been completely updated to account for the newly received records, and step 225 is done.

FIG. 7(c) illustrates index records $320_{1-7}$ that are added to the master table index 204 in response to the records retrieved in response to Query 1. Since Query 1 is the first query performed by the record management system 200, no index records existed in the master table index 204 prior to the master table index 204 being updated in response to Query 1. As shown in FIG. 7(c), a dimension index record 320$_{1-7}$ has been created for each of the dimension values in Query 1.

In addition to identifying a dimension value, each dimension index record 320$_{1-7}$ identifies the master table records which contain the identified dimension value. Each dimension index record 320$_{1-7}$ also identifies the query (Q1) that produced the identified records and the dimension that is associated with the dimension value. For example, the dimension index record 320$_1$ for the 1995 dimension value identifies the associated year dimension (Year) and records 1–4 in Query 1 (Q1: 1–4), which each contain the 1995 dimension value.

In updating the master table index 204 (step 225 (FIG. 5(a)) shown in FIG. 7(c), the record management system 200 performs the sequence of operations shown in FIG. 5(b). For example the index engine 211 selects (240) record one (301 (FIG. 7(a)) from Query 1 in the master table 202. The index engine 211 then selects (241) the 1995 year dimension value in record one 30$_1$. The index engine determines (243) that no dimension index record exists for 1995 in the master table index 204 and creates (245) a dimension index record (320$_1$ (FIG. 7(c)) for the 1995 dimension value. As shown in FIG. 7(c), the newly created record 320, identifies the 1995 dimension value, the Year dimension and record one in Query 1 (Q1:1).

Next, the index engine 211 determines (249) that there are unselected dimension values in the selected record 301$_1$ and selects (241) the East dimension value. The index engine 211 determines (243) that the East dimension value does not have a dimension index record and creates (245) a corresponding dimension index record 320$_3$ in the master table index 204 shown in FIG. 7(c). This new index record 320$_3$ identifies the East dimension value, the Region dimension, and record one of Query 1 (Q1:1).

The index engine 211 continues by determining (249) that the VCR dimension value is unselected in record 301$_1$. The index engine 211 selects (241) the VCR dimension value and determines (243) that no index record exists for this value. Accordingly, a dimension index record 320$_5$ (FIG. 7(c)) is created (245) for the VCR dimension that identifies the VCR dimension value, the Product dimension and, record one of Query 1 (Q1:1). The index engine 211 then determines (249) that all dimension values in record 301 have been selected and further determines (250) that other records have not yet been selected. As a result, a new record is selected (240) and the above described process is repeated for the newly selected record.

2. Multi-Dimensional Views

Once the query map 203 and master table index 204 are updated, thereby completing the update of the record structure foundation, a multi-dimensional view of records can be generated. Embodiments of the present invention provide for independently creating each desired multi-dimensional view, as opposed to merely displaying slices within a single traditional multi-dimensional record structure that cannot be augmented.

The augmentable record structure foundation, which is formed by the query map 203 and master table index 204, is employed to independently create these views. This provides enhanced flexibility in the formatting of views, as well as the ability to efficiently generate views based on multiple queries.

Before a multi-dimensional view is created, the record management system 200 determines, in step 226 (FIG. 5(a)), whether the user wishes to have a view created. The input control unit 201, control engine 209 and display 206 combine to provide the user with an interface for indicating whether a multi-dimensional view is to be generated. If the user does not wish to have a view created, then the record management system 200 determines, in step 220, whether any additional queries are to be performed. If a view is to be created, the record management system 200 proceeds to gather formatting information for generating the view in step 227. The formatting information is retrieved from a user through the combined operation of the control engine 209, input control unit 201, and display unit 206.

The formatting information includes the number of axes that the view will include and the dimensions that are to be represented on each axis. The formatting information also identifies a desired measure that is to be characterized by the axis dimensions and any operations that are to be employed in determining measure results for the view. Such operations include one-pass value operations and two-pass value operations. Examples of one-pass value operations include the summing, averaging, or listing of measure values. Examples of two-pass value operations include percentages and rankings based on one-pass values.

When specifying a two-pass value operation, a placement and one-pass value operation are also specified. The one-pass value operation is employed when calculating one-pass values for use in generating two-pass value measure results. As stated previously, the placement is the listing of a dimension on each axis. In embodiments of the present invention, different placement options are possible.

In one embodiment, a grand placement can be selected in which no particular dimension is selected for any of the axes. In such an embodiment, the set of 100% cells is the set of all cells in the multi-dimensional view. In an alternate embodiment of the present invention, a row grand placement can be selected. In a row grand placement, no placement dimension is selected for the dimensions represented on the horizontal axis. As a result, all of the cells in a set of rows in the multi-dimensional view constitute a set of 100% cells. In yet another embodiment of the present invention, a column grand placement is possible. In a column grand placement, no placement dimension is selected for the vertical axis. As a result, all of the cells in a set of columns in the multi-dimensional view constitute a set of 100% cells.

In further embodiments of the present invention, the record management system 200 automatically selects a placement dimension for at least one axis. After one placement dimension is selected for one axis, the record management system 200 will automatically select the placement dimension for the remaining axes in the multi-dimensional view.

One example of formatting information is provided for a multi-dimensional view having two axes. On a vertical axis, B number of dimensions are to be represented, and on a horizontal axis D number of dimensions are to be represented. The user then specifies that the view contain one-pass value measure results, with a measure to be characterized by the dimensions on the vertical axis and horizontal axis. In order to determine measure results, measure values that are characterized by the same dimension values for the specified measure are to be listed.

Once the formatting information is gathered, the record management system proceeds with the generation of a layout mapping in step 228 (FIG. 5(a)). The layout engine 212 builds the layout mapping in the layout mapping storage unit 205 by utilizing the retrieved formatting information and the record structure foundation formed by the query map 203 and master table index 204.

Figure 5C:
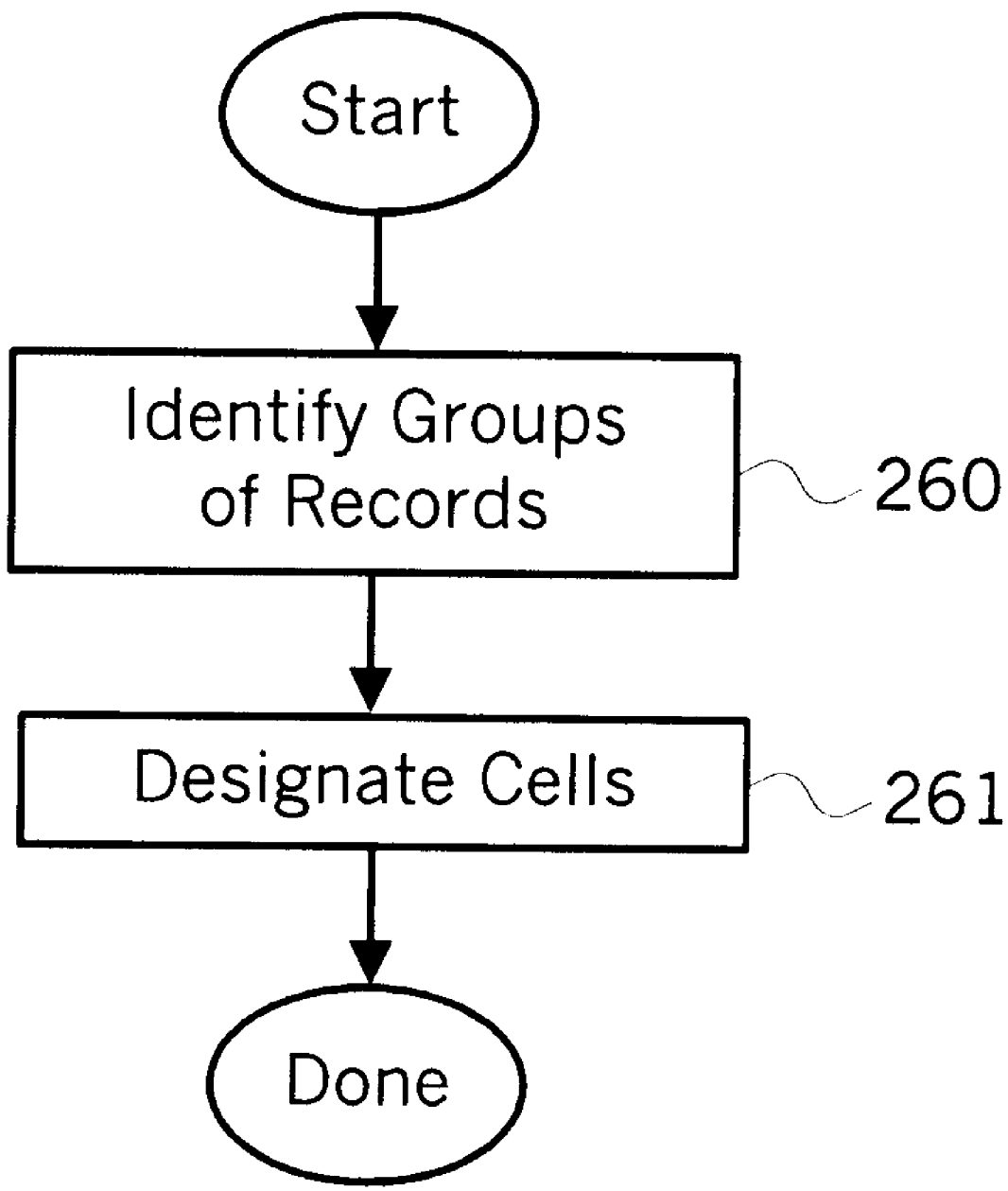

FIG. 5(c) illustrates a sequence of operations performed by the record management system 200 in one embodiment of the present invention for generating a layout mapping in step 228. For each axis in the desired view, the layout engine 212 identifies a set of groups of records in step 260. Each group of records includes records from the master table 202 that contain a specified dimension value from each of the dimensions being represented on the axis. Each group corresponds to a unique combination of dimension values, with each dimension value being from a different one of the axis' dimensions. However, each group is required to comprise at least one record that appears in the master table 202. A group may not consist of no records or be an empty set. Additionally, each record in each group includes at least one measure value that is associated with the measures being characterized in the desired view.

The layout engine 212 also designates cells in memory locations in the layout mapping storage unit 205 in step 261. The cells will later be filled with measure results for the measure being characterized in the view. The cells are designated to correspond to the groups of records on each axis. Each cell corresponds to a group on each axis.

Figure 5D:
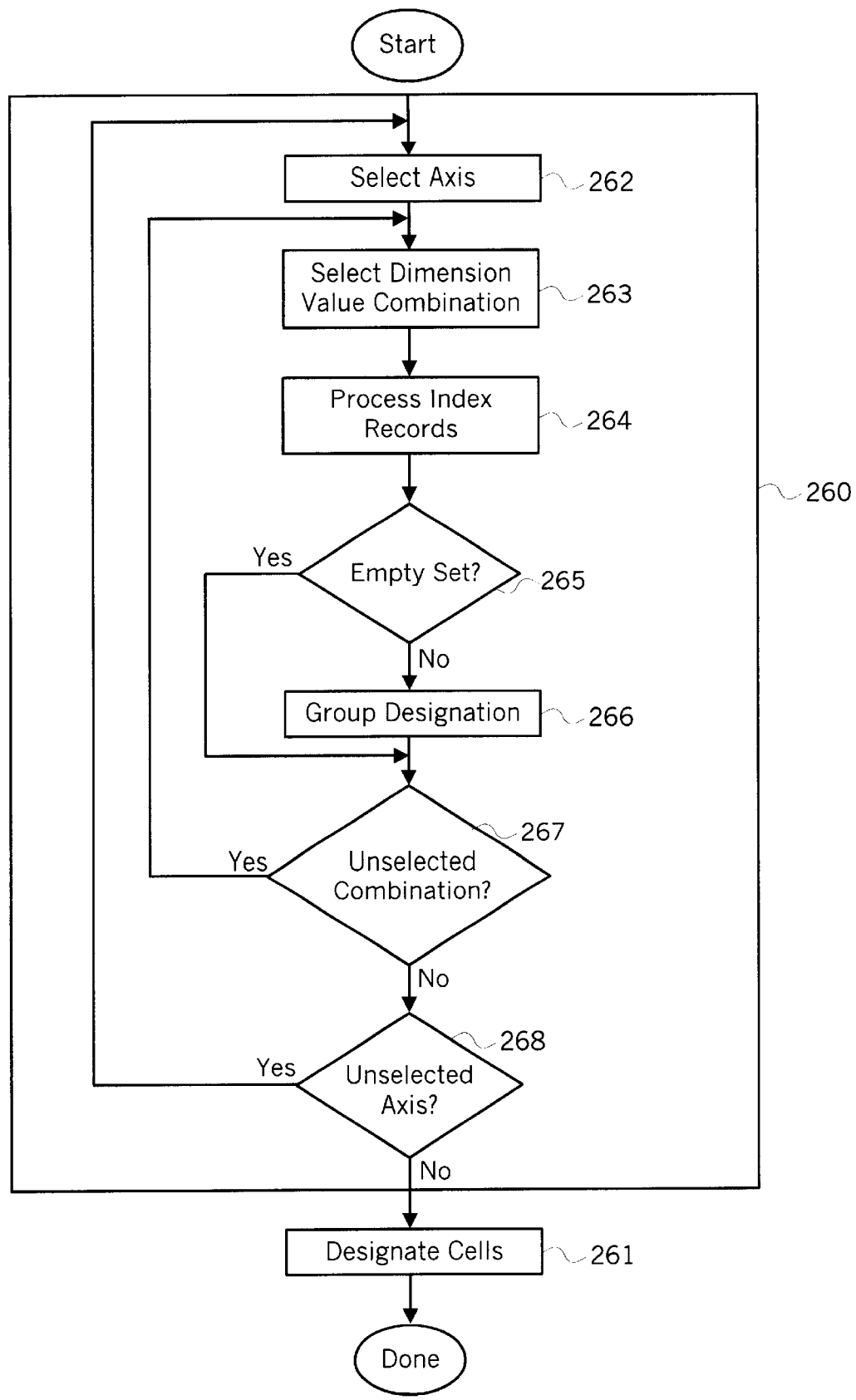

FIG. 5(d) shows a more detailed view of a process performed by the layout engine 212 in one embodiment of the present invention to identify the groups of record sets for each axis in step 260. First, the layout engine 212 selects an axis in step 262. Once an axis is selected, the layout engine 212 selects a combination of dimension values from the dimensions being represented on the axis. The combination consists of one dimension value from each of the dimensions on the axis. The layout engine 212, in step 264, processes the dimension index records for each of the dimension values in the combination.

As a result of the processing in step 264, the layout engine 212 identifies a set of records that are identified in each of the dimension index records being compared. In one embodiment of the present invention, the processing in step 264 includes taking an intersection of the record listings in each of the dimension index records being processed.

After the processing (step 264) is performed, the layout engine, in step 265, determines whether the set of records identified in the processing in step 264 is an empty set. If the set of records is not determined to be the empty set, then a group designation is performed in step 266 to determine which records should be designated into a group for the selected axis. Only records that contain a measure value associated with a measure to be displayed are designated to a group.

In the group designation (step 266), the query map record for each query that produced one of the records identified in the index record comparison (step 264) is examined. If the query map record indicates that the query called for a measure value that is associated with a measure to be displayed in the multi-dimensional view, then the records produced by that query are designated as being in the group. Otherwise, the records produced by that query are not included in the group. If no records are designated as being in the group, then no group is created. If at least one record has been designated into the group, then a group is created for the selected axis.

After finding an empty set in step 265 or performing group designation in step 266, the layout engine 212 determines, in step 267, whether any combination of dimension values for the selected axis has not yet been selected. If a combination has not yet been selected, the layout engine 212 returns to step 263 to select a new combination and repeat the above-described process illustrated in FIG. 5(d). Otherwise, the layout engine 212 determines whether any axis has not yet been selected in step 268. If any axis has not yet been selected, then the layout engine 212 returns to step 262 to select a new axis and repeat the above-described process illustrated in FIG. 5(d). If all of the axes have been selected, the layout engine 212 proceeds to designate cells for the layout mapping in step 261.

As described above, a multi-dimensional view may be required to have B dimensions on a vertical axis, D dimensions on a horizontal axis, and a measure being displayed in the view. In such a case, the layout engine 212 generates a set of groups of records for the horizontal axis and a set of groups of records for the vertical axis. For each of these axes, the layout engine 212 selects dimension value combinations, processes sets of dimension index records for each combination, and performs group designation operations as described above with reference to FIG. 5(d).

When the horizontal axis is selected, each dimension index record being processed identifies a dimension value that is associated with one of the D dimensions. Further, each of the D dimensions is identified in one of the dimension index records being processed. The processing identifies the records that are listed in all of the dimension index records being processed.

The records that are identified by the processing in step 264 undergo a group designation operation (step 266) to determine if a group is to be created for the horizontal axis using these records. The records that include a measure value that is associated with the measure to be displayed are designated as a group of records for the horizontal axis. If a processing reveals that no record sets are listed in all of the dimension index records being compared or that no record resulting from the processing includes a measure value associated with the measures to be displayed, then no group is established for the combination of dimension values being compared. All of the groups in the horizontal axis are identified by repeating the above identified processing of index records and group designation operation for each permutation of dimension values for the different D dimensions. A set of groups of records is also identified for the vertical axis of the view. The set of groups for the vertical axis is identified by using the same operations as are performed to obtain the set of groups for the horizontal axis, with the B dimensions replacing the D dimensions.

The layout engine 212 designates cells (step 261) to correspond to the set of groups on the horizontal axis and the set of groups on the vertical axis. The cells reside in the layout mapping storage unit 205. Each cell corresponds to a group on the vertical axis and a group on the horizontal axis. Accordingly, the measure represented in each cell is characterized by the B dimensions and D dimensions.

In the case of the record structure foundation that is formed by the query map 203 in FIG. 7(b) and the master table index 204 in FIG. 7(c), a layout mapping can be generated based on formatting information that is provided to the layout engine 212. For example, a user may specify a multi-dimensional view format having the region dimension represented on a vertical axis, the year and product dimensions represented on a horizontal axis, and Sales($) measure values used to determine one-pass value measure results for cells that are characterized by the dimensions on the horizontal and vertical axes. The measure results may be determined by listing the retrieved measure values for a cell.

FIG. 8 shows a layout mapping 270 of cells $332_{1-10}$ for such a view. The layout mapping includes five sets of cells ($332_1$ & $332_6$, $332_2$ & $332_7$, $332_3$ & $332_8$, $332_4$ & $332_9$, and $332_5$ & $332_{10}$) extending across the horizontal axis with each cell set including two cells. On the horizontal axis 330, there are five groups of records (1H, 2H, 3H, 4H, and 5H) with each one corresponding to one of the sets of cells. Each of the groups on the horizontal axis 330 corresponds to a unique pair of dimension values for the year and product dimensions. On the vertical axis 331, there are two groups of records (1V and 2V) with each group corresponding to a different cell in each of the cell sets. One group on the vertical axis 331 includes records that identify the East Region, and the other group includes records that identify the West region.

The horizontal and vertical axis groups of records have been ascertained by employing the master table index 204 shown in FIG. 7(c) to perform the processing operation described above. The query map shown in FIG. 7(b) has been used to perform the group designation described above. The following Table A shows the combinations of dimension index records that are processed (step 264) to obtain the five groups designated (step 266) on the horizontal axis 330.

TABLE A

| INDEX RECORD PROCESSING | GROUP RECORDS | GROUP |
|---|---|---|
| 1995 ∩ VCR | Q1: 1, 3 | 1H |
| 1995 ∩ TV | Q1: 2, 4 | 2H |
| 1995 ∩ Stereo | NONE | NONE |
| 1996 ∩ VCR | Q1: 5, 8 | 3H |
| 1996 ∩ TV | Q1: 6, 9 | 4H |
| 1996 ∩ Stereo | Q1: 7, 10 | 5H |

As shown in Table A, the groups of the horizontal axis 330 are obtained by identifying records in the master table 202 that include the following: 1) either a 1995 or 1996 year dimension value, 2) either a VCR, TV, or stereo product dimension value, and 3) a Sales ($) measure value. For example, a processing (step 264) of the records identified in the 1995 dimension index record $320_1$ and VCR dimension index record $320_5$ shows that master table records Q1:1 and Q1:3 each contain a 1995 dimension value and a VCR dimension value. These records are then designated (step 266) as group 1H, because each record produced by Query 1, as shown in query map record 311 (FIG. 7(b)), contains a measure value associated with the Sales ($) measure.

The same processing (step 264) is made for each combination of a year dimension value and a product dimension value. A group designation (step 266) operation is then performed on records identified in each processing to determine which records, if any, will be designated in a group. Since no common records are listed in the 1995 dimension index record 320, and stereo dimension index record $320_7$, no group is designated for the combination of the 1995 and stereo dimension values. Each processing in Table A is performed by making a comparison in which an intersection ("∩") is taken of the records listed in each of the dimension index records being processed.

The following Table B shows the dimension index records that are processed to obtain the two groups in the vertical axis 331 set of groups. Since each of these processings (step 264) is being made using only a single dimension index record, all of the records identified in the dimension index record undergo a group designation (step 266) to determine if they include a measure associated with the Sales($) measure. All of the records identified in the East index record $320_3$ are from Query 1, so they are designated as Group 1V. The records identified in the West index record $320_4$ are similarly all from Query 1, so they are designated as Group 2V.

TABLE B

| INDEX RECORD PROCESSING | GROUP RECORDS | GROUP |
|---|---|---|
| East | Q1: 1–2, 5–7 | 1V |
| West | Q1: 3–4, 8–10 | 2V |

In accordance with the present invention, cell sets are only designated to groups of records that are identified in Tables A and B. This reduces the designation of unused memory locations in the record management system 200. Accordingly, a layout mapping generated by record management system 200 will not wastefully designate cells for the 1995 sales of stereos in either the East or West.

Once the layout mapping is generated (step 228, FIG. 5(a)), the layout engine generates a set of axis trees in step 231 (FIG. 5(a)). These axis trees are maintained in the layout mapping storage unit 205. As explained above, a set of axis trees is generated for each axis in the multi-dimensional view, with each tree including a set of axis nodes for each dimension that is represented on an axis.

For example, when a view's vertical axis is specified to represent B dimensions, an axis tree with sets of axis nodes for each of the B dimensions is formed for the vertical axis. For the D dimensions on the view's horizontal axis, an axis tree is formed with a set of axis nodes for each of the D dimensions.

Figure 6:
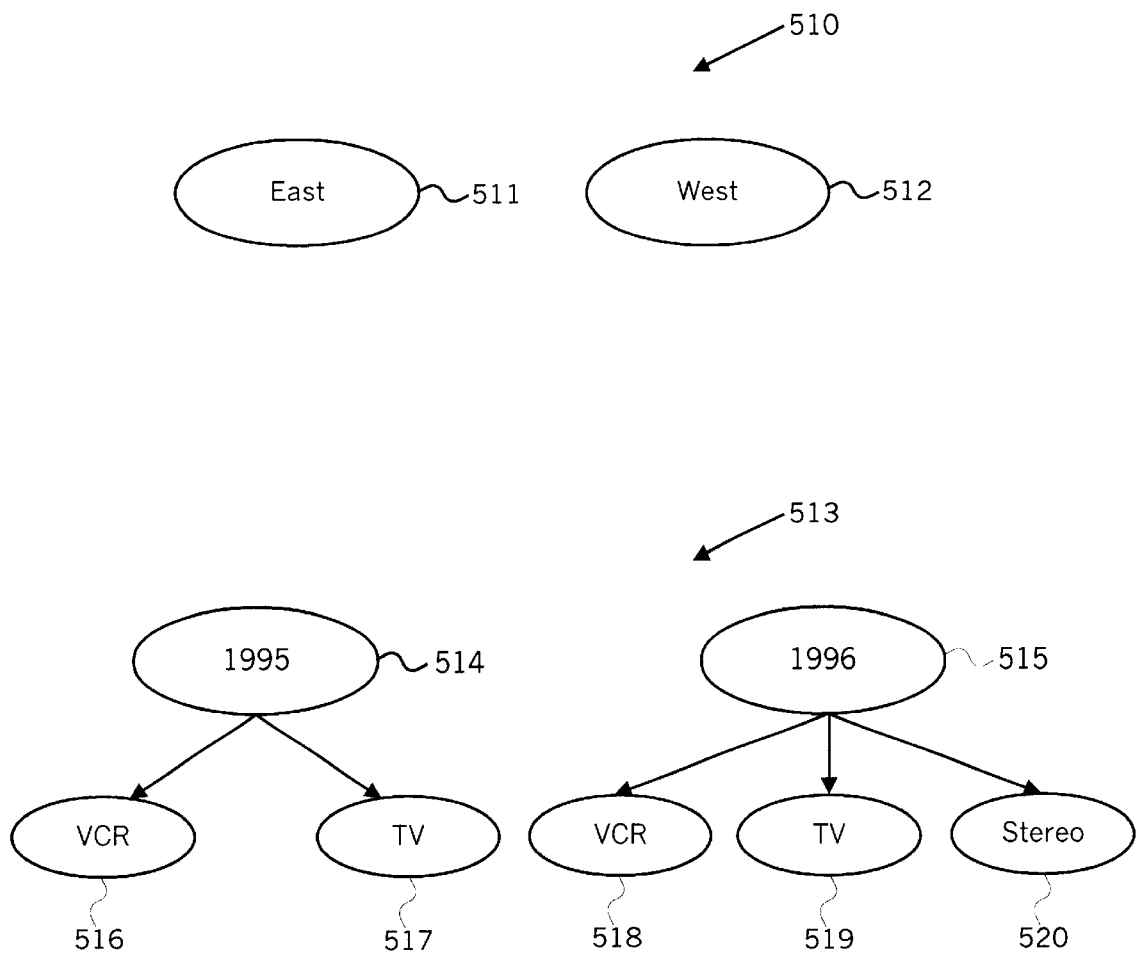
FIG. 6 illustrates a set of axis trees for a multi-dimensional view in accordance with the present invention.

FIG. 6 illustrates a set of axis trees 510, 513 for the above-described example in which the x-axis is defined to represent the year dimension and product dimension, while the y-axis is defined to represent the region dimension. As shown in FIG. 6, the y-axis tree 510 includes two axis nodes 511, 512. Axis node 511 corresponds to the East dimension value, and axis node 512 corresponds to the West dimension value. The East axis node 511 references the 1V record groupings (Table B), since records in this group contain East dimension values. The West axis node 513 references the 2V record groupings (Table B), since records in these group contain West dimension values.

The y-axis tree 513 includes an axis node for the 1995 year dimension value (514) and an axis node for 1996 year dimension value (515). The 1995 axis node 514 references the 1H and 2H groupings of records (Table A), while the 1996 axis node 515 references the 3H, 4H, and 5H groupings of records (Table A). The set of axis nodes 516, 517, 518, 519, 520 for the product dimension includes two VCR axis nodes 516, 518, two TV axis nodes 517, 519, and one stereo axis node 520. Each of the product dimension axis nodes 516–520 references one of the groupings of records in Table A.

In addition to referencing a set of axis groupings of records, each of the axis nodes shown in FIG. 6 identifies the axis nodes to which it is chained. The VCR axis node 516 forms a chain with the 1995 axis node 514, since each of these axis nodes represents a dimension value from group 1H. The TV axis node 517 forms a chain with the 1995 axis node 514, since each of these axis nodes represents a dimension from group 2H. The VCR axis node 518 forms a chain with the 1996 axis node 515, since each of these axis nodes represents a dimension value from group 3H. The TV axis node 519 forms a chain with the 1996 axis node 515, since each of these axis nodes represents a dimension value from group 4H. The stereo axis node 520 forms a chain with the 1996 axis node 515, since each of these axis nodes represents a dimension value from group 5H.

Once the axis tree generation (FIG. 5(a)) is completed, the record management system 200 generates a multi-dimensional view in step 229 (FIG. 5(a)). The generation of the view is performed by converting the layout mapping into a multi-dimensional view. This includes generating a display for each axis in the view, determining measure results, and placing the measure results into the layout mapping's cells. The layout engine 212 performs the operations that are necessary to convert the layout mapping into a display view, which also resides in the layout mapping storage unit 205.

Figure 5E:
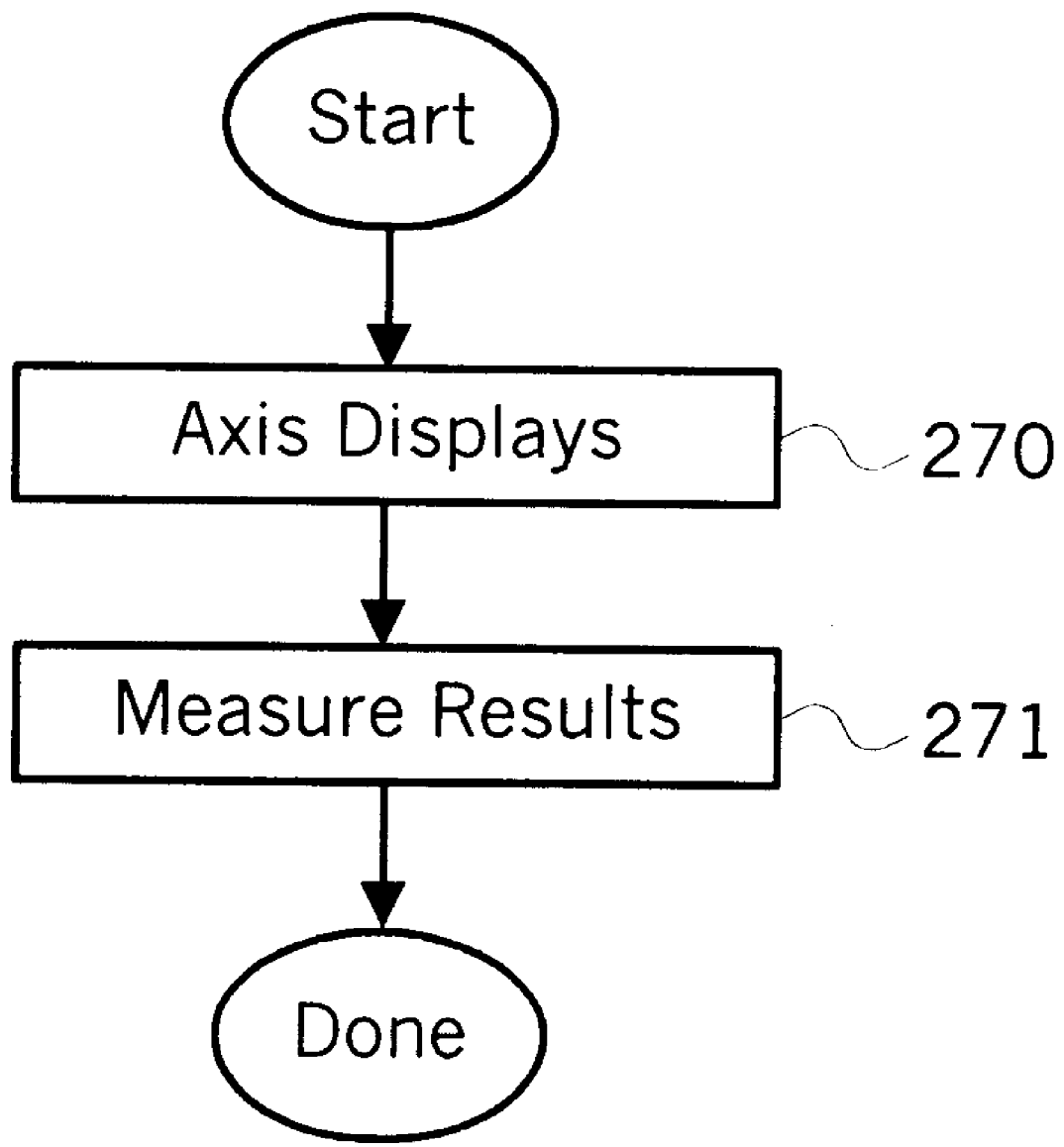

FIG. 5(e) illustrates a sequence of operations performed by the layout engine 212 in one embodiment of the present invention to generate a multi-dimensional view in step 229. The layout engine 212 generates a display for each axis of the view in step 270. For each cell in the layout mapping, the layout engine 212 then determines a set of measure results and loads the measure results into the cell in step 271.

Figure 5F:
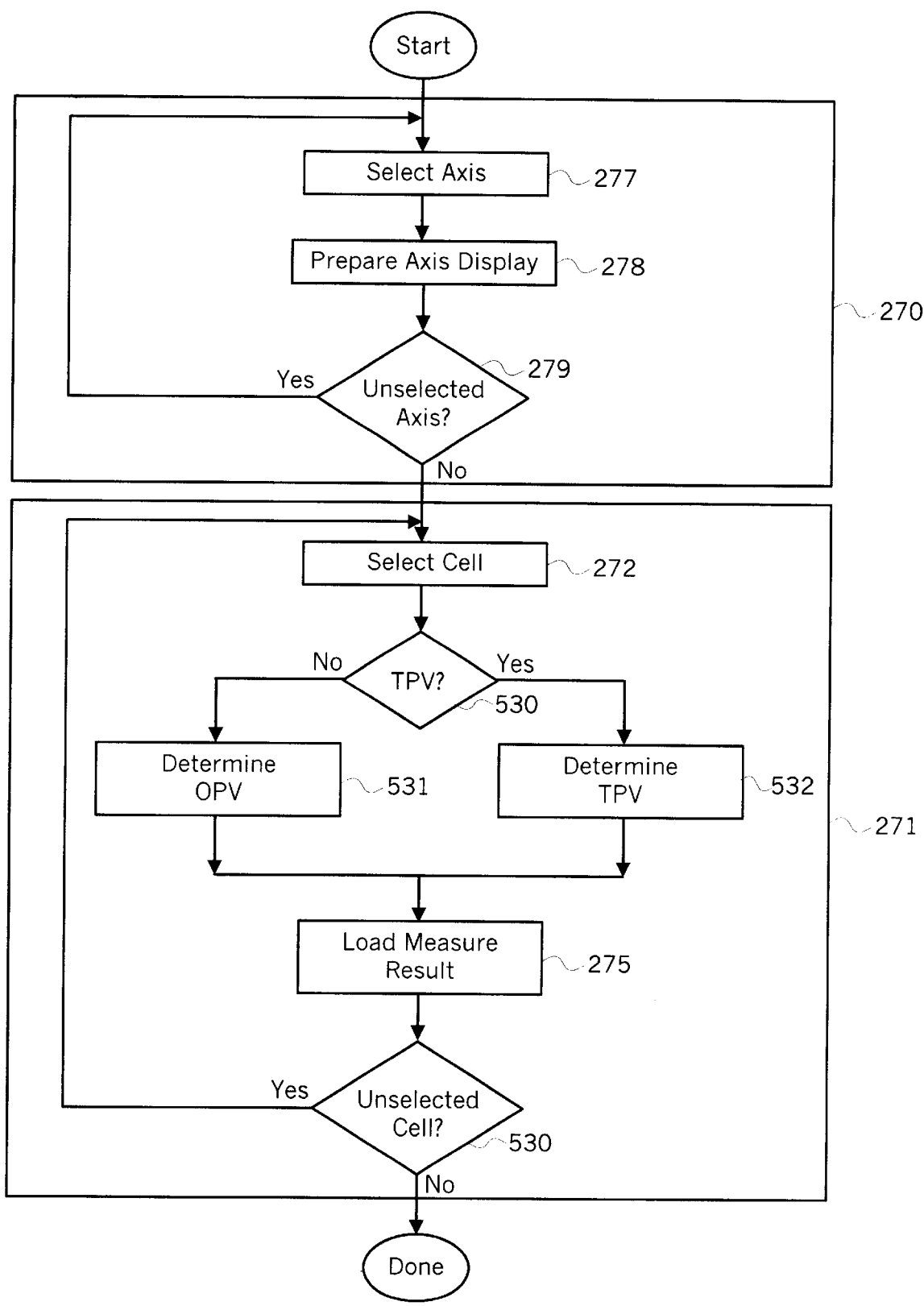

FIG. 5(f) shows a more detailed sequence of operations for the steps illustrated in FIG. 5(e) for one embodiment of the present invention. In order to generate the axis displays in step 271, the layout engine 212 selects one of the axes for the view in step 277. For the selected axis, a display is prepared in step 278.

In preparing the display, the axis is divided into a number of segments that is equal to the number of groups of records for the axis. Each segment is then labeled to correspond to one of the groups. A representation of the labeled segments is then stored in the layout mapping storage unit 212. Each segment on the axis will be aligned with a set of cells from the layout mapping when the view is displayed.

Once the axis display is prepared for the selected axis, the layout engine determines, in step 279, whether any axis for the view has not yet been selected and had a display prepared. If any one of the axes has not been selected, the layout engine returns to step 277 to select another axis and prepare a display as described above. If all of the axes have been selected, then the layout engine proceeds to determine and load measure results in step 271.

In determining and loading the measure results in step 271, the layout engine 212 selects a cell in the layout mapping in step 272. The layout engine 212 then determines whether the measure result to be determined is a two-pass value ("TPV") measure result, in step 530. If the measure result is a two-pass value measure result, then the two-pass value measure result is determined in step 532. Otherwise, a one-pass value ("OPV") measure result is determined in step 531.

Once the layout engine 212 determines a measure result for the selected cell, it loads the measure result into the cell in step 275. If the set of records identified for a cell is the empty set, the corresponding measure result for the cell is assigned a value to reflect such an occurrence. For example, the symbol "N/A" may be provided to indicate that a measure result is "Not Available" in such an instance.

Once the measure result for a cell is loaded, in step 275, the layout engine 212 determines whether any cells in the layout mapping have not been selected to have a measure result determined in step 276. If any cell has not been selected, the layout engine returns to step 272 to select another cell and determine and load a measure result for the cell. If all of the cells have been selected, then the view generation is done.

Figure 5G:
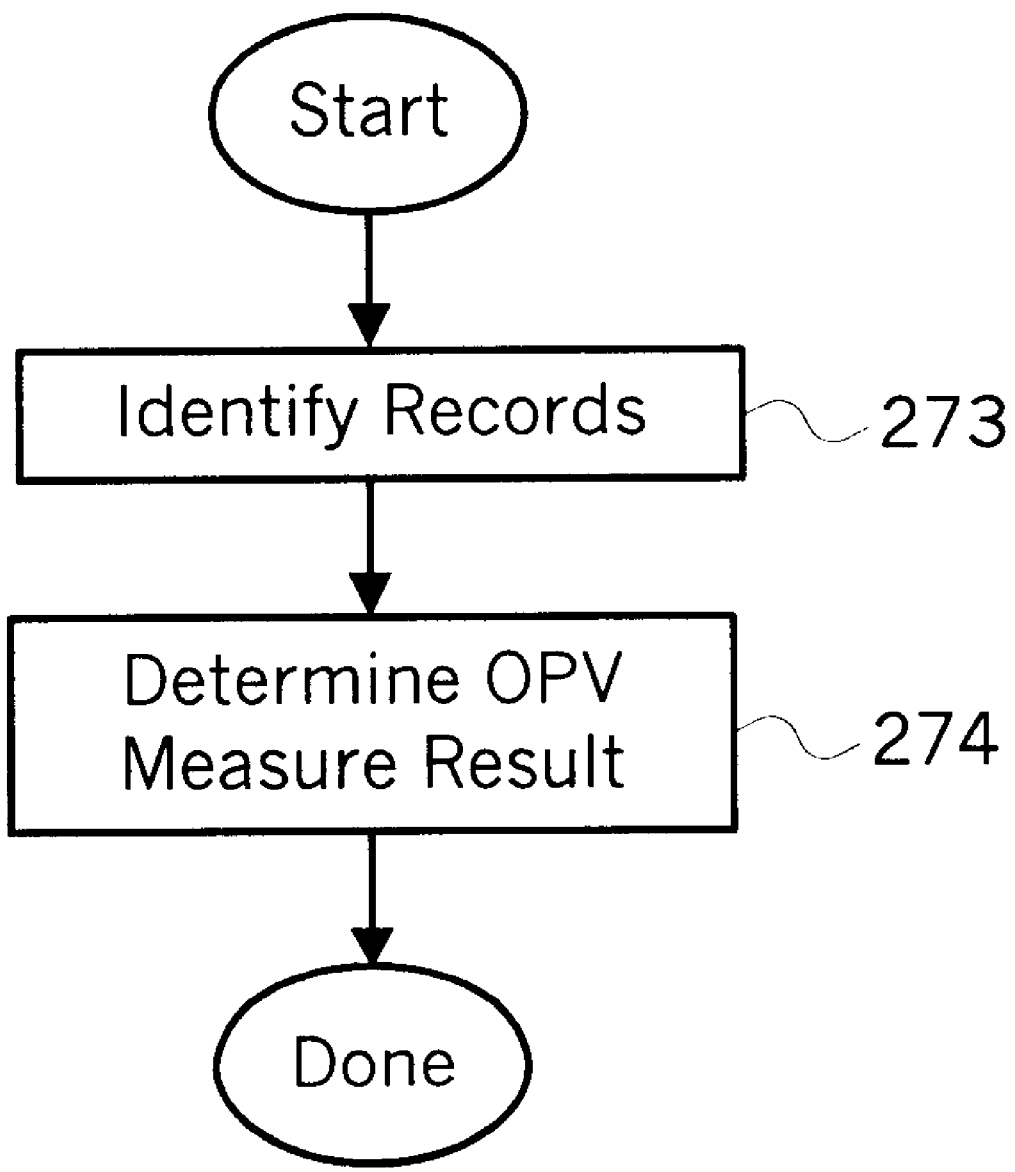

FIG. 5(g) illustrates a sequence of operations for performing the step of determining a one-pass value measure result (step 531, FIG. 5(f)) for a selected cell in one embodiment of the present invention. First, records in the master table 202 for use in determining the one-pass value measure result are identified in step 273. Next, the layout engine 212 uses the identified records to determine a measure result for the cell in step 274. The layout engine 212 retrieves the measure values in the identified master table 202 records and determines the measure result according to a user specified operation. Such operations include listing, summing, or averaging values in each of the identified records.

Figure 5H:
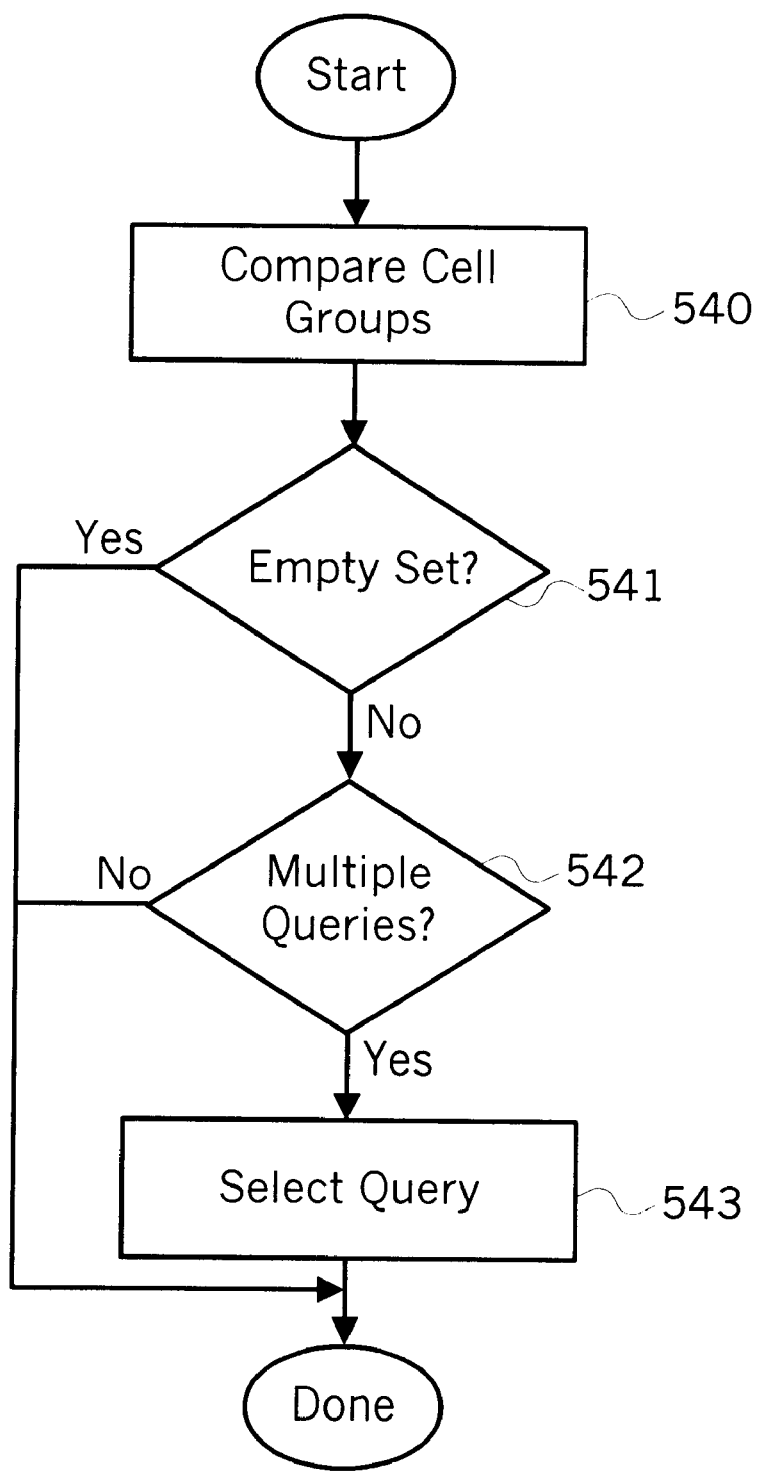

FIG. 5(h) illustrates a sequence of operations performed by the record management system 200 to identify 273 the master table 202 records. First, the groups of records from each axis of the layout mapping that correspond to the selected cell are compared in step 540. The layout engine's comparison identifies records that are in each axis group being compared and contain a measure value associated with the measure to be represented in the cell. In one embodiment of the present invention, this identification is achieved by taking an intersection of the records listed in each group being compared.

Next, a determination is made in step 541 of whether any records were identified in the comparison (step 540). If no records were identified, the identified set of records is the empty set, and the identification step 273 is done. Otherwise, a determination is made in step 542 of whether the identified records come from multiple queries. If the identified records come from a single query, then the process of identifying records 273 is done. Otherwise, a query is selected in step 543.

The query selection is made by comparing the records in the query map 203 (FIG. 4). The query map's records are compared to determine which query calls for the measure being represented and only a set of dimensions that match the dimensions being employed in the view. Only a query meeting this criteria is selected. The records that are generated by the selected query are identified as the records to be used in determining measure results for the selected cell.

After the query selection (step 543) is completed, the identification of records (step 273, FIG. 5(g)) is done. Once the identification of records (step 273) is done, if either no records are identified or no query is selected, then the measure result will be designated as not available ("N\A").

Figure 5I:
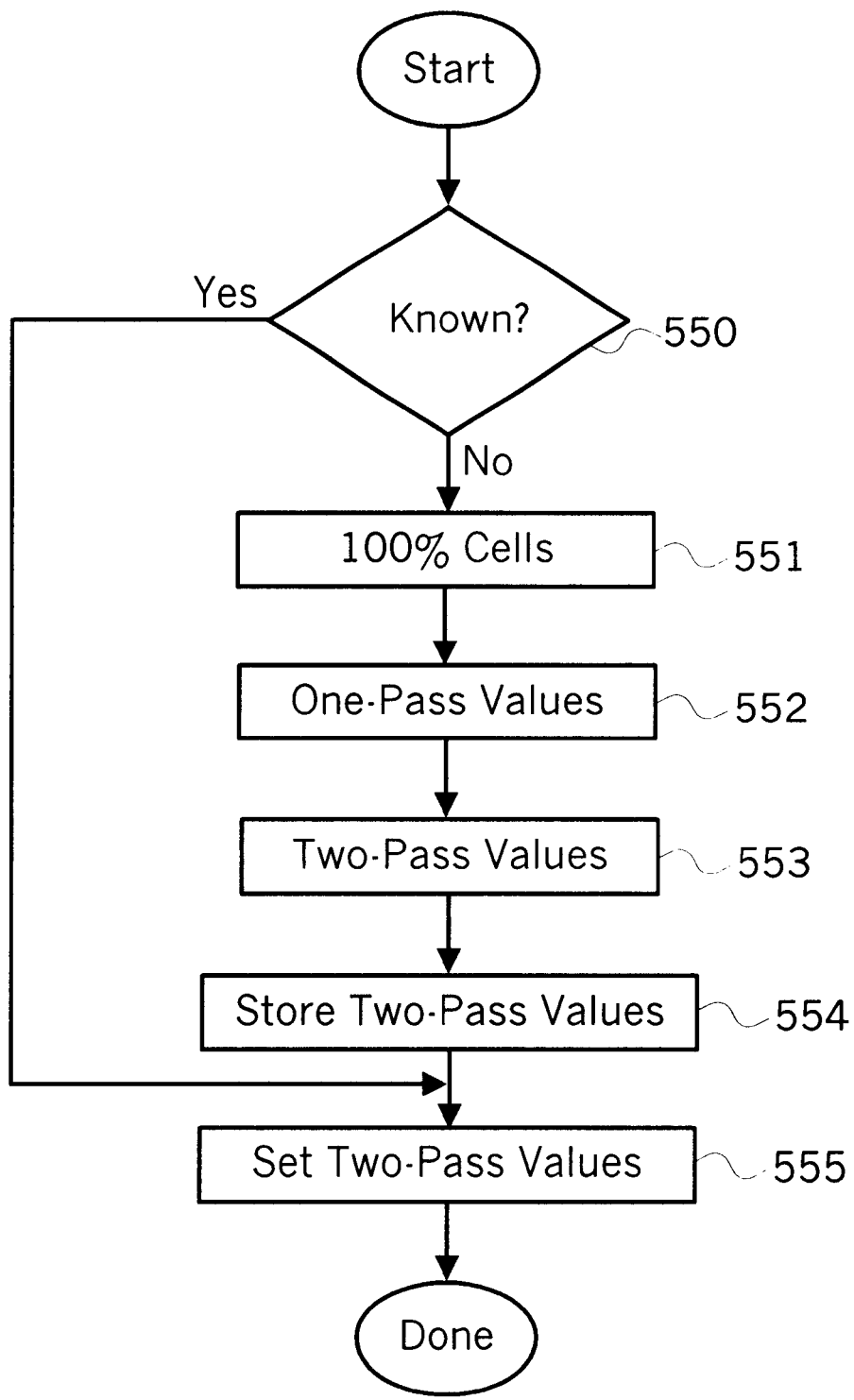

FIG. 5(i) illustrates a sequence of operations performed by the record management system 200 to determine a two-pass value measure result for the selected cell (step 532, FIG. 5(f)). First, a determination is made in step 550 of whether a two-pass value measure result is already known for the selected cell. If a two-pass value measure result is known, a two-pass value measure result is set for the cell in step 555. Otherwise, a set of 100% cells is identified in step 551. In identifying the set of 100% cells, a set of combinations of groups of records is identified. This set of combinations includes all combinations of groups that are needed to determine the two-pass value measure result for the selected cell.

Figure 5J:
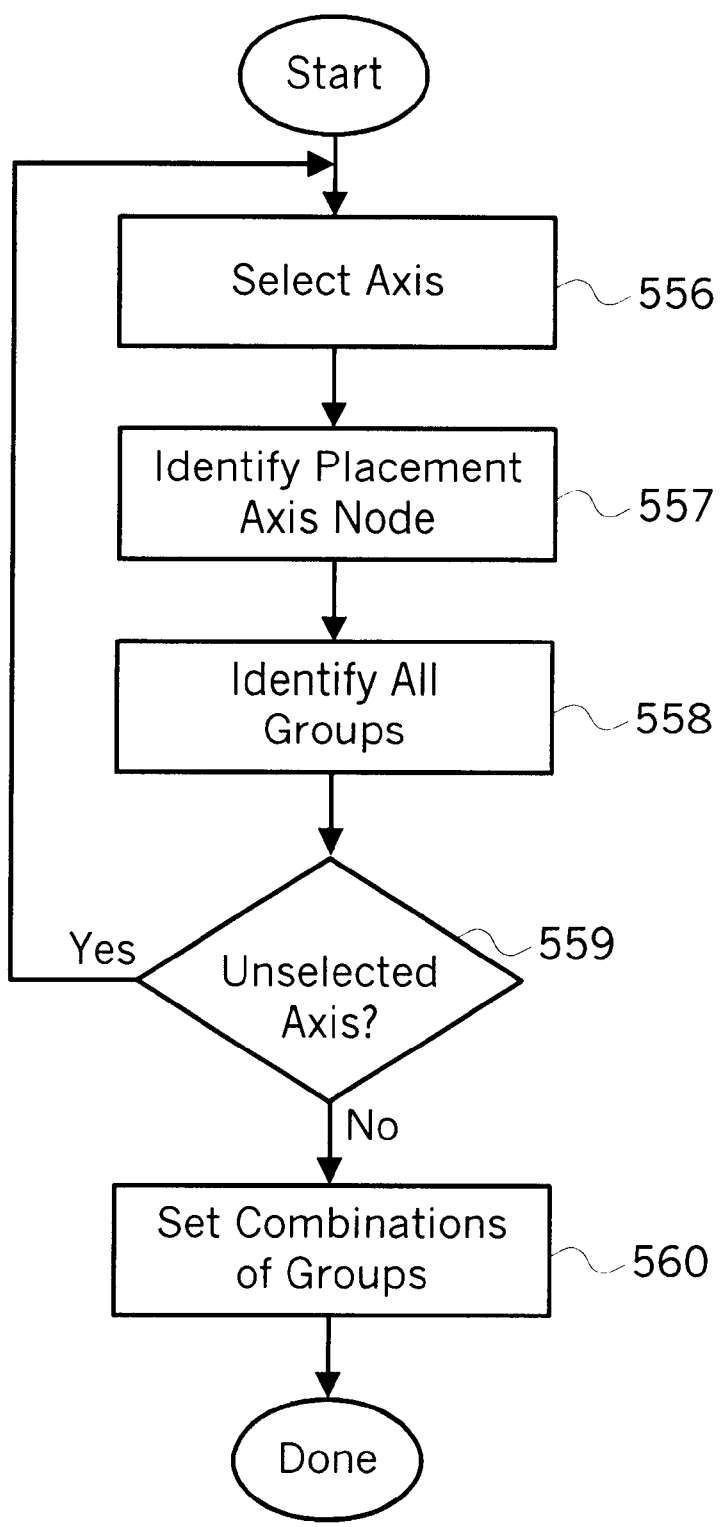
Figure 5K:
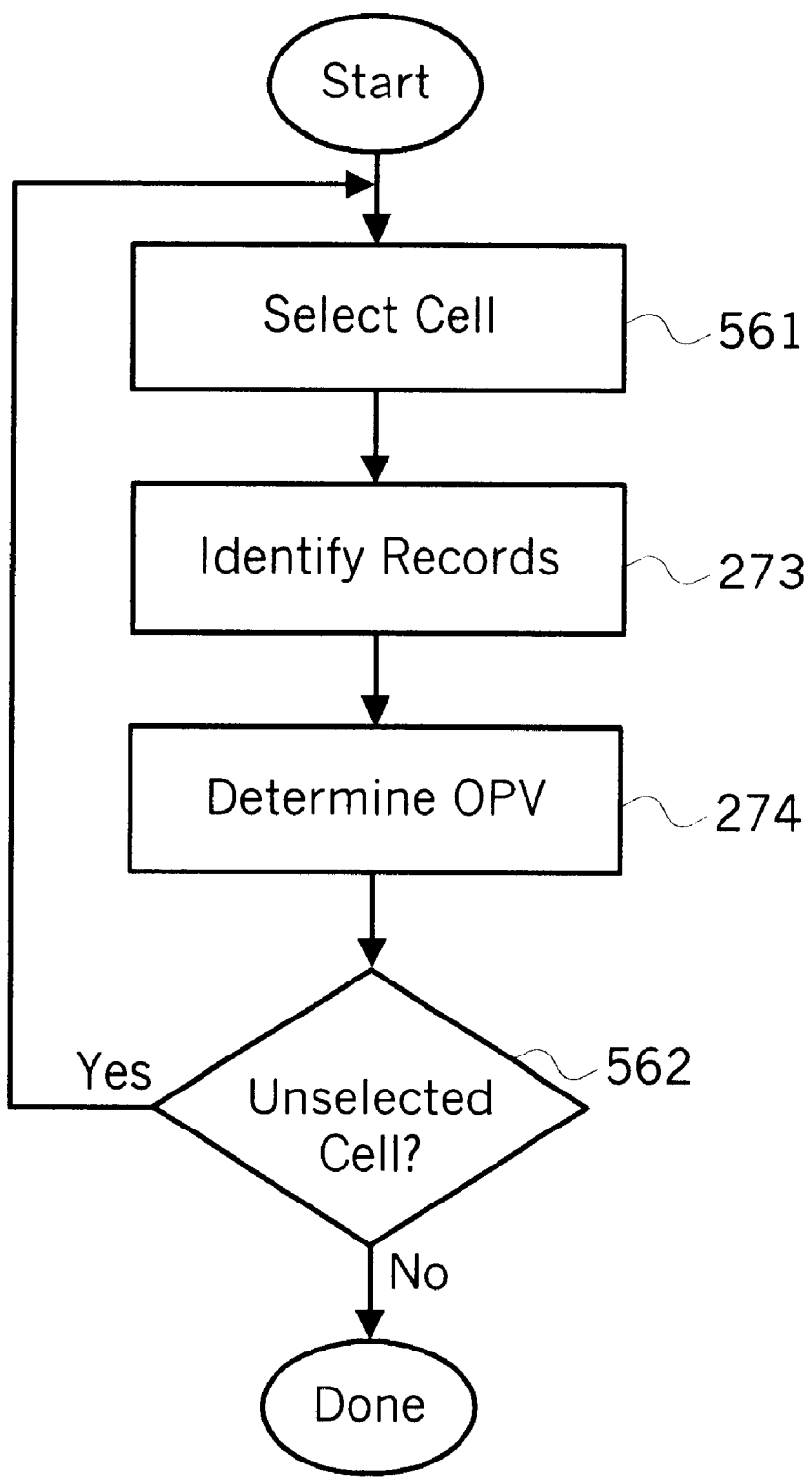
Figure 5L:
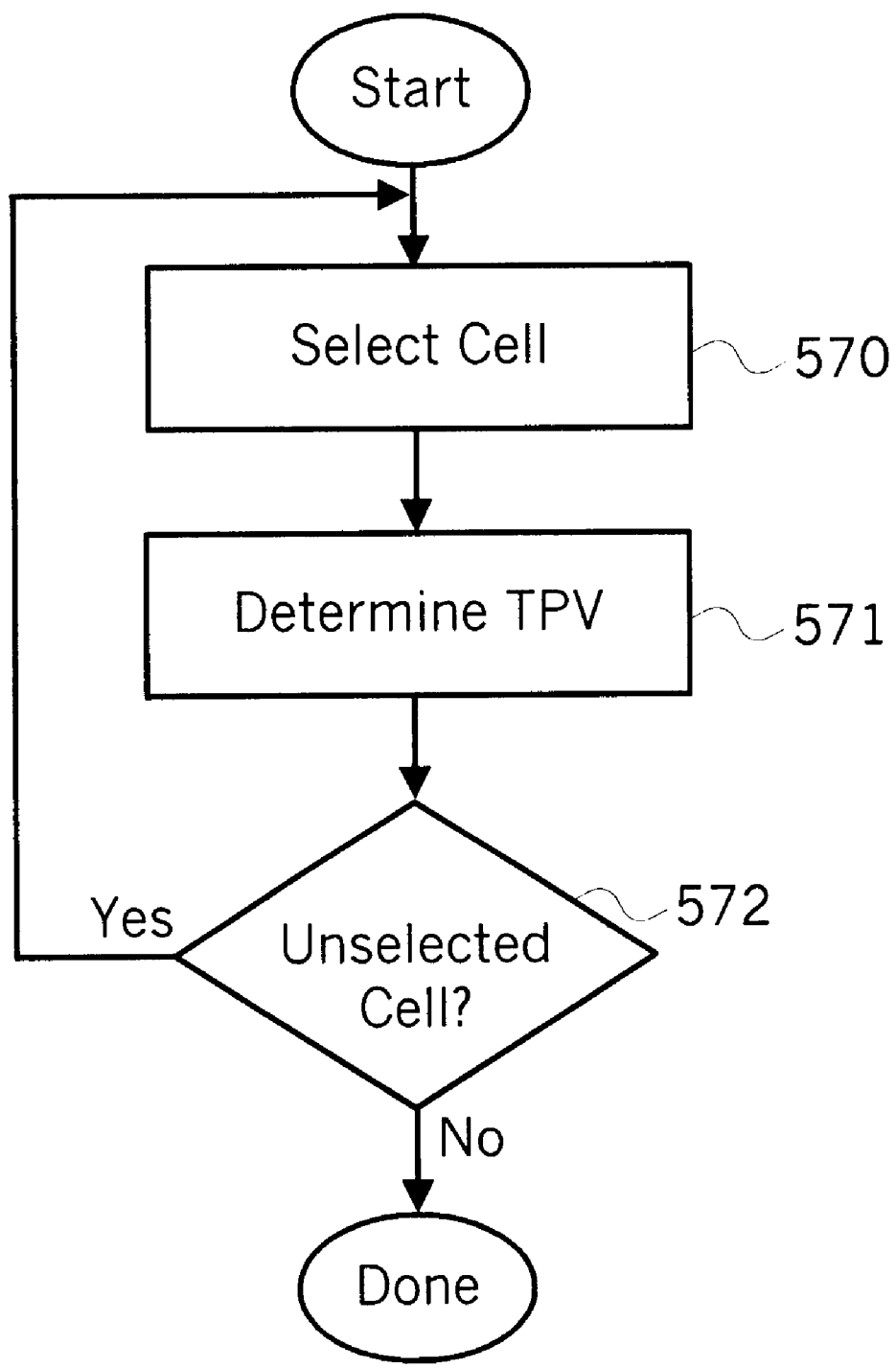

FIG. 5(j) illustrates a sequence of operations for identifying the set of 100% cells (step 551). An axis from the multi-dimensional view is selected in step 556. For the selected axis, a placement axis node is identified in step 557. The placement axis node is in the set of axis nodes for the selected axis' placement dimension. The placement axis node must also reference all groups of records on the selected axis that correspond to the selected cell.

In identifying the placement axis node, the layout engine 212 queries axis nodes to determine whether they are in the set of axis nodes for the placement dimension. If an axis node is not in the placement dimension, the layout engine 212 retrieves a reference to an axis node that is chained to the present axis node. The layout engine then queries the chained node to determine whether it is in the placement dimension. If an axis node is in the placement dimension, the layout engine 212 queries the node to determine whether it contains all the required groups of records. If not, a new axis node is queried. Otherwise, the placement axis node is identified.

Once the placement axis node is identified, all of the groups of records referenced in the placement axis node are identified in step 558 (FIG. 5(*i*)). After the groups of records in the placement axis node are identified, a determination is made of whether there are any unselected view axes in step 559.

If it is determined that there is at least one unselected axis, then an axis is selected in step 556 and the above-described process steps (steps 557–559) are repeated. If it is determined that there is not an unselected axis, then combinations of groups are set in step 560. Each combination is set to include one identified grouping of records from each axis in the view, and combinations are set so that there is a combination for each permutation of identified groups. As a result, each combination corresponds to a cell in the multi-dimensional view. These cells are the set of 100% cells.

Once the set of 100% cells is determined in step 551 (FIG. 5(*i*)), a one-pass value is determined for each of the 100% cells in step 552. FIG. 5(*k*) illustrates a sequence of operations performed by the record management system 200 in accordance with the present invention to calculate a one-pass value for each of the 100% cells. First, a cell in the set of 100% cells is selected in step 561. A set of records is then identified for that cell in step 273, which is the same as the record identification step 273 of FIG. 5(*g*). Next, a one-pass value is determined for the selected cell in step 274, which is the same as the measure result determination performed in step 274 of FIG. 5(*g*).

Once a one-pass value is determined, a determination is made of whether any of the cells in the set of 100% cells is unselected in step 562. If it is determined that there is at least one unselected cell, then a new cell in the set of 100% cells is selected and the above-described process steps (273, 274 and 562) are repeated. Otherwise, the determination of one-pass values for each of the cells in the set of 100% cells is done.

After the set of one-pass values is determined (step 552, FIG. 5(*i*)), a two-pass value measure result is calculated for each of the cells in the set of 100% cells in step 553 (Fig. (i)). FIG. 5(*l*) illustrates a sequence of operations for making such a determination of two-pass value measure results. First, a cell in the set of 100% cells is selected in step 570. A two-pass value measure result for the selected cell is then calculated in step 571.

Once the two-pass value measure result is calculated, a determination is made in step 572 of whether any of the cells in the set of 100% cells have not yet been selected. If any of the cells remain unselected, then a new cell is selected in step 570 and a two-pass value measure result is determined for the cell in step 571. Otherwise, the process of determining the two-pass value measure results for the set of 100% cells (step 553, FIG. 5(*i*)) is done.

When calculating a two-pass value measure result for a cell in a set of 100% cells, the calculation is made in accordance with a specified two-pass value operation. In one embodiment of the present invention, a percentage two-pass value operation is to be performed for a selected cell. Such an operation is performed according to the following equation:

$$TPV = (OPV / \Sigma OPV) * 100\% \qquad (\text{Eqn. 1})$$

wherein:
   OPV is the one-pass value for the selected cell;
   $\Sigma OPV$ is the sum of all one-pass values for the cells in the set of 100% cells corresponding to the selected cell; and
   TPV is the two-pass value measure result.

In an alternate embodiment of the present invention, the two-pass value operation is a ranking. In such an embodiment, the two-pass value measure result is calculated by assigning a number to a cell's two-pass value measure result. The assigned number corresponds to the relative magnitude of the one-pass value for the cell as compared to the one-pass values for all of the other cells in a corresponding set of 100% cells.

Once all of the two-pass value measure results have been determined (step 553, FIG. 5(*i*)), these two-pass value measure results are loaded into a data cache, in step 554 (FIG. 5(*i*)). In one embodiment of the present invention, this data cache is maintained in the layout mapping storage unit 205. The two-pass value measure results stored in this cache are employed when determining (step 550, FIG. 5(*i*)) whether the two-pass value measure result is already known for a selected cell.

After the data cache has been loaded (step 554), a two-pass value measure result is set for the selected cell in step 555. In one embodiment of the present invention, the two-pass value measure result is set (step 555) by reading a two-pass value measure result from the data cache.

Once the multi-dimensional view is generated in step 229 (FIG. 5(*a*)), the view is displayed on the display unit 206 in step 230. The display unit 206 is instructed to display the loaded cells from the layout mapping and the axis displays. The cells and axis displays are provided on the display unit 206 so that on each axis of the layout mapping's cells a corresponding axis display is shown with each segment in the axis display aligned with a corresponding set of cells. After the display (step 230) is completed, the record management system 200 determines whether another view is to be generated, in step 226.

As described above, the user may have specified that D dimensions be represented on a horizontal axis, B dimensions be represented on a vertical axis, and a measure be characterized by the B and D dimensions in a view. In such a case, X groups of record sets may have been identified for the D dimensions, and Y groups of record sets may have been identified for the B dimensions. Each cell in the layout mapping corresponds to a group in the set of X groups and a group in the set of Y groups. The layout engine 212 also generates an axis tree for the B set of dimensions and an axis tree for the D set of dimensions.

When determining one-pass values, the layout engine 212 identifies a set of records for each cell to determine a measure result (step 273). The set of records for a cell is identified (step 273) by identifying records that: 1) are in both a corresponding one of the groups on the horizontal axis and a corresponding one of the groups on the vertical axis; and 2) contain a measure value associated with the measure to be represented in the cell. If no records are identified, then an empty set value is assigned as the set of records for the cell. For each cell, the measure values in the identified set of records are used to determine the one-pass value (step 274) for the cell.

FIG. 9 illustrates a multi-dimensional view that is generated by the layout engine 212 in accordance with the present invention, based on the layout mapping in FIG. 8 and the axis trees in FIG. 6. In FIG. 9, the measure results are one-pass value measure results determined by listing measure values corresponding to each cell $332_{1\text{-}10}$ in the view.

For each cell $332_{1\text{-}10}$, the layout engine 212 identifies records (step 273) by taking an intersection of the records listed in the corresponding vertical axis group and the records listed in the corresponding horizontal axis group. Table C below shows the results of the layout engine's 212 identification of records (step 273, Fig. (g)) for each of the cells $332_{1\text{-}10}$.

TABLE C

| CELL | GROUP COMPARISON | RECORDS | OPV |
|---|---|---|---|
| $332_1$ | 1H ∩ 1V<br>Q1: 1, 3 ∩ Q1: 1–2, 5–7 | Q1: 1 | $50,000 |
| $332_2$ | 2H ∩ 1V<br>Q1: 2, 4 ∩ Q1: 1–2, 5–7 | Q1: 2 | $50,000 |
| $332_3$ | 3H ∩ 1V<br>Q1: 5, 8 ∩ Q1: 1–2, 5–7 | Q1: 5 | $60,000 |
| $332_4$ | 4H ∩ 1V<br>Q1: 6, 9 ∩ Q1: 1–2, 5–7 | Q1: 6 | $20,000 |
| $332_5$ | 5H ∩ 1V<br>Q1: 7, 10 ∩ Q1: 1–2, 5–7 | Q1: 7 | $20,000 |
| $332_6$ | 1H ∩ 2V<br>Q1: 1, 3 ∩ Q1: 3–4, 8–10 | Q1: 3 | $40,000 |
| $332_7$ | 2H ∩ 2V<br>Q1: 2, 4 ∩ Q1: 3–4, 8–10 | Q1: 4 | $60,000 |
| $332_8$ | 3H ∩ 2V<br>Q1: 5, 8 ∩ Q1: 3–4, 8–10 | Q1: 8 | $50,000 |
| $332_9$ | 4H ∩ 2V<br>Q1: 6, 9 ∩ Q1: 3–4, 8–10 | Q1: 9 | $25,000 |
| $332_{10}$ | 5H ∩ 2V<br>Q1: 7, 10 ∩ Q1: 3–4, 8–10 | Q1: 10 | $25,000 |

For each cell $332_{1\text{-}10}$, the measure value in the identified record for the cell is retrieved from the master table 202 and listed in the cell. For example, in formulating a measure result for the first cell $332_1$, the layout engine 212 identifies (step 273) the set of records listed in both the 1995, VCR group (1H) and the East group (1V). This identification is achieved by taking an intersection of the records in group 1H (Q1:1,3) and the records in group 1V (Q1: 1–2,5–7). The identified set of records includes only record 1 from Query 1 (Q1:1). In order to determine the measure result (step 274) for cell $332_1$, the layout engine 212 retrieves the measure value in record 1 of Query 1 (Q1:1) from the master table 202. The retrieved measure value of $50,000, which also serves as the listed measure result in this example, is then loaded (step 275) into cell $332_1$.

In addition to loading measure results into each of the cells $332_{1\text{-}10}$ shown in FIGS. 8 and 9, a horizontal axis 333 (FIG. 9) display and vertical axis 334 (FIG. 9) display are prepared. The horizontal axis 333 display includes segments for each of the following groups: 1) 1995, VCR (1H); 2) 1995, TV (2H); 3) 1996, VCR (3H); 4) 1996, TV (4H); and 5) 1996, Stereo (5H). The vertical axis 334 display includes segments for each of the following groups: 1) East (1V); and 2) West (2V).

In displaying (step 230, FIG. 5(*a*)) the view shown in FIG. 10, each horizontal axis segment is aligned to a corresponding set of cells, and each vertical axis segment is aligned to a corresponding set of cells. On the horizontal axis 333, the display unit 206 bifurcated the horizontal axis display into two levels with each level corresponding to a different dimension on the horizontal axis. However, the horizontal axis 333 display still only contains one segment for each of the groups of record sets on the horizontal axis 333.

In another example, the layout engine converts the multi-dimensional layout mapping shown in FIG. 8 into the multi-dimensional view shown in FIG. 10. In such an example, the formatting information is the same as for FIG. 9 with the exception of the measure results being two-pass value measure results. The x-axis placement dimension is the year dimension, and the y-axis placement dimension is the region dimension. The two-pass value operation is percentage, with one-pass values being determined using a listing operation.

In preparing the multi-dimensional view in FIG. 11, a cell $332_{1\text{-}10}$ is selected (Step 272, FIG. 5(*f*)). A determination is made of whether a two-pass value is known for the selected cell (Step 550, FIG. 5(*i*)). If no value is known, a set of 100% cells is identified (step 551, FIG. 5(*i*)). As described above, each cell in the set of 100% cells corresponds to a set of combinations of record groups from each of the view's axes. Table D below shows a set of combinations of groups of records for all cells $332_{1\text{-}10}$ in the view. Each set of combinations corresponds to a set of 100% cells for that cell. For example, the set of 100% cells for cell 332, is defined by the cells corresponding to the combination of groups 1H and 1V and the combination of groups 2H and 1V.

TABLE D

| CELL | SET OF COMBINATIONS |
|---|---|
| $332_1$ | 1H & 1V; 2H & 1V |
| $332_2$ | 1H & 1V; 2H & 1V |
| $332_3$ | 3H & 1V; 4H & 1V; 5H & 1V |
| $332_4$ | 3H & 1V; 4H & 1V; 5H & 1V |
| $332_5$ | 3H & 1V; 4H & 1V; 5H & 1V |
| $332_6$ | 1H & 2V; 2H & 2V |
| $332_7$ | 1H & 2V; 2H & 2V |
| $332_8$ | 3H & 2V 4H & 2V; 5H & 2V |
| $332_9$ | 3H & 2V; 4H & 2V; 5H & 2V |
| $332_{10}$ | 3H & 2V; 4H & 2V; 5H & 2V |

Using the information in Table D, one-pass values are determined (step 552, Fig. (i) ) for each of the cells in the set of 100% cells corresponding to the selected cell. The one-pass values for each of the cells $332_{1\text{-}10}$ in the layout mapping in FIG. 8 are shown in the rightmost column in Table C above. For example, the one-pass value for cell $332_1$ is $50,000.

After the one-pass values have been determined, the two-pass value measure results for each of the cells in the set of 100% cells is calculated (step 553) as percentages according to Equation 1. The two-pass value measure results are then stored (step 554), and the two-pass value measure result for the selected cell is set (step 555). The two-pass value measure result is then loaded into the selected cell (step 275, FIG. 5(*f*)) in the layout mapping (FIG. 8). The above-described process steps are repeated until all cells in the view have two-pass value measure results.

The results of the two-pass value calculations in this example are shown below in Table E. In Table E, the set of 100% cells, one-pass value, and two-pass value measure result are listed for each cell $332_{1\text{-}10}$. For example, for cell $332_1$, a set of 100% cells includes cells $332_1$ and $332_2$, and the one-pass value and two-pass value measure result are $50,000 and 50%, respectively.

TABLE E

| CELL | 100% CELLS | OPV | TPV |
|---|---|---|---|
| $332_1$ | $332_1$, $332_2$ | $50,000 | 50% |
| $332_2$ | $332_1$, $332_2$ | $50,000 | 50% |
| $332_3$ | $332_3$, $332_4$, $332_5$ | $60,000 | 60% |

TABLE E-continued

| CELL | 100% CELLS | OPV | TPV |
| --- | --- | --- | --- |
| $332_4$ | $332_3, 332_4, 332_5$ | $20,000 | 20% |
| $332_5$ | $332_3, 332_4, 332_5$ | $20,000 | 20% |
| $332_6$ | $332_6, 332_7$ | $40,000 | 40% |
| $332_7$ | $332_6, 332_7$ | $60,000 | 60% |
| $332_8$ | $332_8, 332_9, 332_{10}$ | $50,000 | 50% |
| $332_9$ | $332_8, 332_9, 332_{10}$ | $25,000 | 25% |
| $332_{10}$ | $332_8, 332_9, 332_{10}$ | $25,000 | 25% |

The generation of the axes display (step 270, FIG. 5(e)) is the same for the two-pass value example as for the one-pass value example.

Many more multi-dimensional two-pass value views can be generated by employing the data records in FIG. 7(a) and embodiments of the present invention. In particular, any desired two-pass value measure result can be calculated without the need for performing additional queries. This is not the case in traditional record management systems, as described above, in which two-pass value measure results are calculated during the retrieval of data records. In such traditional systems, only the pre-calculated two-pass value measure results can be employed.

For example, it may be desirable to create a multi-dimensional view similar to the one in FIG. 10, but having a grand placement. Such a view is shown in FIG. 11. Creating the view in FIG. 11 with a traditional record management system would only be possible if the two-pass value measure results for the grand placement were calculated at the time the underlying data records were retrieved. If this is not the case, a new query will have to be performed. With embodiments of the present invention no new query is necessary, and the view in FIG. 11 can be generated by performing the process steps set forth in FIGS. 5(a)–5(l).

C. Computer Hardware

Figure 12:
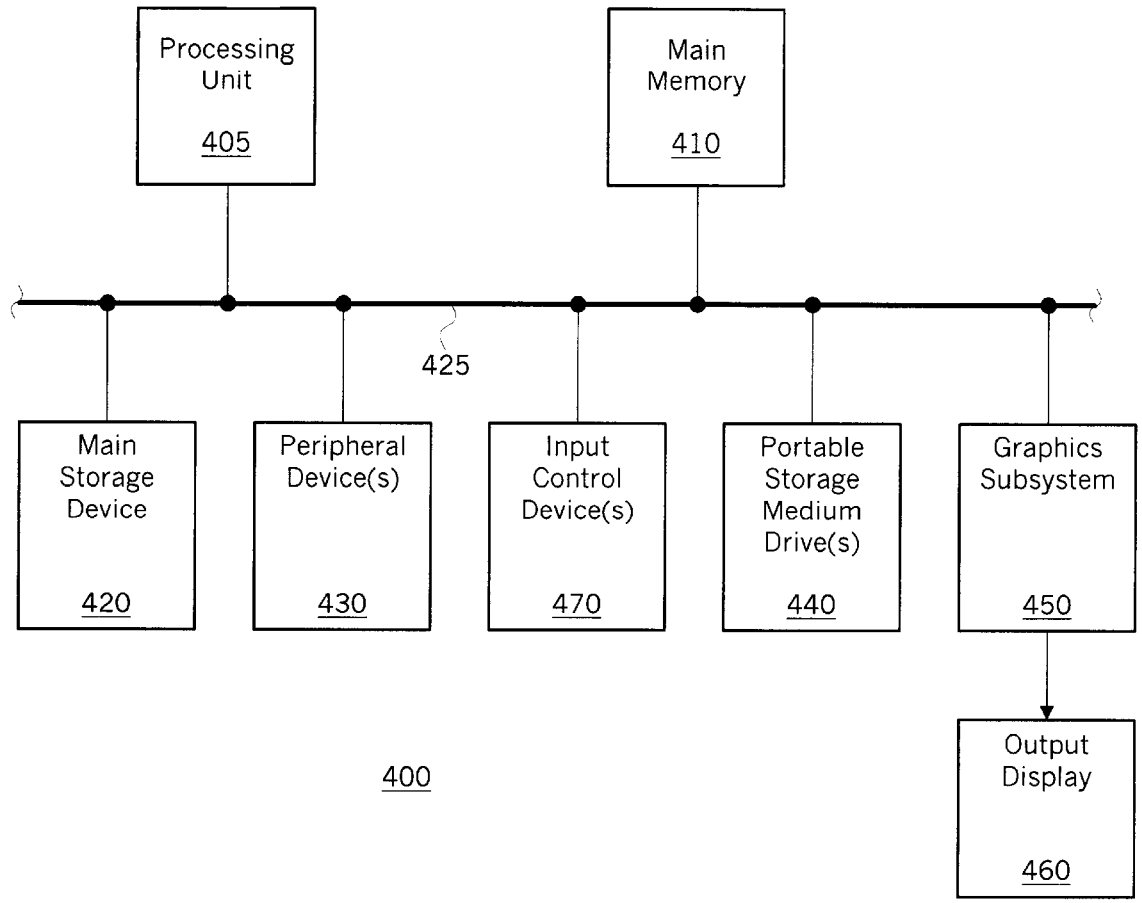
FIG. 12 illustrates computer system hardware that is employed in one embodiment of the present invention to operate the multi-dimensional record management system shown in FIG. 4.

FIG. 12 illustrates a high level block diagram of a general purpose computer system 400, which is employed in embodiments of the present invention as a record management system 200. Accordingly, the computer system 400 is employed for performing a number of processes, including those illustrated in FIGS. 5(a)–5(l).

The computer system 400 contains a processing unit 405, main memory 410, and an interconnect bus 425. The processing unit 405 may contain a single microprocessor, or may contain a plurality of microprocessors for configuring the computer system 400 as a multi-processor system. In one embodiment of the present invention, the processing unit 405 serves as the processor for each of the processing engines in the record management system 200. Accordingly, the control engine 209, query engine 210, index engine 211, and layout engine 212 can be implemented using the processor unit 405 in conjunction with a memory or other data storage medium containing corresponding application specific program code instructions for each engine.

The main memory 410 stores, in part, instructions and data for execution by the processing unit 405. If a process, such as the processes illustrated in FIGS. 5(a)–5(l), is wholly or partially implemented in software, the main memory 410 stores the executable instructions, in one embodiment of the present invention, for implementing the process when the computer is in operation. For example, the main memory 410 stores program code instructions to be employed by the control engine 209, query engine 210, index engine 211, and layout engine 212 or a subset of these engines. The master table storage unit 202, query map storage unit 203, master table index storage unit 204, layout mapping storage unit 205, and metadata storage unit 207 are also be implemented in the main memory 410, in one embodiment of the present invention. The main memory 410 may include banks of dynamic random access memory (DRAM) as well as high speed cache memory.

The computer system 400 further includes a mass storage device 420, peripheral device(s) 430, portable storage medium drive(s) 440, input control device(s) 470, a graphics subsystem 450, and an output display 460. For purposes of simplicity, all components in the computer system 400 are shown in FIG. 12 as being connected via the bus 425. However, the computer system 400 may be connected through one or more data transport means. For example, the processor unit 405 and the main memory 410 may be connected via a local microprocessor bus, and the mass storage device 420, peripheral device(s) 430, portable storage medium drive(s) 440, and graphics subsystem 450 may be connected via one or more input/output (I/O) busses.

The mass storage device 420, which can be implemented with a magnetic disk drive or an optical disk drive, is a non-volatile storage device for storing data and instructions for use by the processor unit 405. In some software embodiments of the present invention, the mass storage device 420 stores the instructions executed by the computer system 400 to perform processes for the control engine 209, query engine 210, index engine 211, and layout engine 212, such as those illustrate in FIGS. 5(a)–5(l). The mass storage device 420 can also act as a storage medium for the master table storage unit 202, query map storage unit 203, master table index storage unit 204, layout mapping storage unit 205, and metadata storage unit 207.

The portable storage medium drive 440 operates in conjunction with a portable non-volatile storage medium, such as a floppy disk, a compact disc read only memory (CD-ROM), or an integrated circuit non-volatile memory adapter (i.e. PC-MCIA adapter) to input and output data and code to and from the computer system 400. In one embodiment, the instructions for enabling the computer system 400 to execute processes, such as those illustrated in FIGS. 5(a)–5(l), are stored on such a portable medium, and are input to the computer system 400 via the portable storage medium drive 440.

The peripheral device(s) 430 include any type of computer support device, such as an input/output (I/O) interface, to add additional functionality to the computer system 400. For example, the peripheral device(s) 430, in one embodiment of the present invention, includes a communications controller, such as a network interface card or integrated circuit. The communications controller provides for interfacing the computer system 400 to a communications network. Instructions for enabling the computer system 400 to perform processes, such as those illustrated in FIGS. 5(a)–5(l), can be downloaded into the computer system's main memory 410 over a communications network. The computer system 400 may also interface to a database management system 213 over a communications network or other medium that is supported by the peripheral device(s) 430.

The input control device(s) 470 provide a portion of the user interface for a user of the computer system 400. The input control device(s) 470 may include an alphanumeric keypad for inputting alphanumeric and other key information, a cursor control device, such as a mouse, a trackball, stylus, or cursor direction keys. The input control device(s) 470 serve as the input control unit 201 for the record management system 200.

In order to display textual and graphical information, such as multi-dimensional views, the computer system 400 contains the graphics subsystem 450 and the output display 460. The output display 460 may include a cathode ray tube (CRT) display or liquid crystal display (LCD). The graphics subsystem 450 receives textual and graphical information, and processes the information for output to the output display 460. The graphics subsystem 450 and output display 460 may combine to form the display unit 206 for the record management system.

The components contained in the computer system 400 are those typically found in general purpose computer systems. In fact, these components are intended to represent a broad category of such computer components that are well known in the art.

The process steps and other functions described above with respect to embodiments of the present invention may be implemented as software instructions. More particularly, the process steps illustrated in FIGS. 5(*a*)–5(*l*), as well as the operations performed by the control engine 209, query engine 210, index engine 211, and layout engine 212, may be implemented as software instructions. For the preferred software implementation, the software includes a plurality of computer executable instructions for implementation on a general purpose computer system. Prior to loading into a general purpose computer system, the software instructions may reside as encoded information on a computer readable medium, such as a magnetic floppy disk, magnetic tape, and compact disc read only memory (CD—ROM). In one hardware implementation, circuits may be developed to perform the process steps and other functions described herein.

Although aspects of the present invention have been described with respect to specific examples of multi-dimensional views that may be formed and in terms of specific exemplary embodiments, it will be appreciated that various modifications and alterations might be made by those skilled in the art without departing from the spirit and scope of the invention.

What is claimed is:

1. A computer implemented method for determining a two-pass value measure result representing a measure in a multi-dimensional view containing cells, based on records maintained in a computer readable medium, said method comprising the steps of:

(a) identifying a set of cells in said multi-dimensional view, wherein said set of cells includes all cells needed for determining said two-pass value measure result;

(b) determining a one-pass value for each cell in said all cells; and (c) determining said two-pass value measure result based on said one-pass values determined in said step (b).

2. The method of claim 1, wherein said step (a) includes the step of:

identifying a set of combinations of groups of said records, wherein said set of combinations includes all combinations of groups needed to determine said two-pass value measure result.

3. The method of claim 2, wherein said step (b) includes the step of:

determining a one-pass value for each combination in said all combinations.

4. The method of claim 3, wherein said view characterizes two-pass value measure results by a set of D dimensions and a set of B dimensions, wherein each combination in said all combinations includes a group in a first set of groups of records and a group in a second set of groups of records, wherein each record in said first set and each record in said second set is maintained in a master table after being retrieved by a record management system in response to a query in a set of queries, and wherein D and B are integers, wherein said step of determining a one-pass value for each combination in said all combinations includes the steps of:

identifying records that are in both a first group in said first set of groups and a second group in said second set of groups;

selecting a query in said set of queries that calls for said D dimensions, said B dimensions, and said measure;

selecting a view set of records, wherein each record in said view set of records is identified in said step of identifying records and has been retrieved by said record management system in response to said query selected in said step of selecting a query; and determining a one-pass value based on records in said view set of records.

5. The method of claim 4, wherein said step of identifying records includes the step of:

taking an intersection of said first group and said second group to identify records that are in both said first group and said second group.

6. The method of claim 4, wherein said step of selecting a query includes the steps of:

accessing a set of query map records, wherein each query map record in said set of query map records identifies a query from said set of queries, a set of dimensions called for by said query from said set of queries, and a set of measures called for by said query from said set of queries; and selecting a query that is identified in said set of query map records by a query map record having contents that consist of an identifier for said query, each of said D dimensions, each of said B dimensions, and a set of measures including said measure.

7. The method of claim 2, wherein said step of identifying a set of combinations includes the step of:

identifying a first placement axis node for an axis of said multi-dimensional view, wherein said first placement axis node corresponds to a first set of groups of records.

8. The method of claim 7, wherein said step of identifying a set of combinations further includes the step of:

identifying a second placement axis node for an axis of said multi-dimensional view, wherein said second placement axis node corresponds to a second set of groups of records.

9. The method of claim 8, wherein each combination in said all combinations includes a group in said first set of groups and a group in said second set of groups.

10. The method of claim 7, wherein said step of identifying a first placement axis node includes the steps of:

selecting an axis node;

determining whether said axis node is in a set of axis nodes corresponding to a placement dimension; and determining whether said axis node corresponds to a group of records that corresponds to a cell in which said two-pass value measure result is to be displayed.

11. The method of claim 1, wherein said step (c) includes the step of:

determining a two-pass value measure result for each cell in said set of cells based on said one-pass values determined in said step (b).

12. The method of claim 11, further including the step of:

(d) storing all said two-pass value measure results determined in said step (c).

13. The method of claim 1, wherein said two-pass value measure result is a percentage.

14. The method of claim 13, wherein said step (c) includes the steps of:

calculating said two-pass value measure result according to the following equation:

$$TPV = (OPV/\Sigma OPV) * 100\%$$

wherein:

TPV is said two-pass value measure result;

OPV is a one-pass value determined in said step (b); and

ΣOPV is a summation of all one-pass values determined in said step (b).

15. The method of claim 1, wherein said step (c) includes the steps of:

assigning said two-pass value measure result a value indicating a relative magnitude of a one-pass value determined in said step (b) in comparison to at least one other one-pass value determined in said step (b).

16. The method of claim 1, further including the step of:

(e) prior to performing said steps (a)–(c), determining whether said two-pass value measure result is known.

17. A computer readable medium having a set of instructions stored therein for enabling a computer to determine a two-pass value measure result representing a measure in a multi-dimensional view containing cells, based on records, said set of instructions comprising:

a first set of instructions, which when executed by a computer cause the computer to identify a set of cells in said multi-dimensional view, wherein said set of cells includes all cells needed for determining said two-pass value measure result;

a second set of instructions, which when executed by the computer cause the computer to determine a one-pass value for each cell in said all cells; and a third set of instructions, which when executed by the computer cause the computer to determine said two-pass value measure result based on said one-pass values determined in response to said second set of instructions.

18. The computer readable medium of claim 17, wherein said first set of instructions includes:

a fourth set of instructions, which when executed by the computer cause the computer to identify a set of combinations of groups of said records, wherein said set of groups includes all combinations of groups needed to determine said two-pass value measure result.

19. The computer-readable medium of claim 18, wherein said fourth set of instructions includes:

a thirteenth set of instructions, which when executed by the computer cause the computer to identify a first placement axis node for a first axis of said multi-dimensional view, wherein said first placement axis node corresponds to a first set of groups of records.

20. The computer-readable medium of claim 19, wherein said fourth set of instructions further includes:

a fourteenth set of instructions, which when executed by the computer cause the computer to identify a second placement axis node for a second axis of said multi-dimensional view, wherein said second placement axis node corresponds to a second set of groups of records, wherein each combination in said all combinations includes a group in said first set of groups and a group in said second set of groups.

21. The computer readable medium of claim 19, wherein said thirteenth set of instructions includes:

a fifteenth set of instructions, which when executed by the computer cause the computer to select an axis node;

a sixteenth set of instructions, which when executed by the computer cause the computer to determine whether said axis node is in a set of axis nodes corresponding to a placement dimension; and a seventeenth set of instructions, which when executed by the computer cause the computer to determine whether said axis node corresponds to a group of records that corresponds to a cell in which said two-pass value measure result is to be displayed.

22. The computer readable medium of claim 18, wherein said second set of instructions includes:

a fifth set of instructions, which when executed by the computer cause the computer to determine a one-pass value for each combination in said all combinations.

23. The computer readable medium of claim 22, wherein said view characterizes two-pass value measure results by a set of D dimensions and a set of B dimensions, wherein each combination in said all combinations includes a group in a first set of groups of records and a group in a second set of groups of records, wherein each record in said first set and each record in said second set is maintained in a master table after being retrieved by a record management system in response to a query in a set of queries, and wherein D and B are integers, wherein said fifth set of instructions includes:

a sixth set of instructions, which when executed by the computer, cause the computer to identify records that are in both a first group in said first set of groups and a second group in said second set of groups;

a seventh set of instructions, which when executed by the computer, cause the computer to select a query in said set of queries that calls for said D dimensions, said B dimensions, and said measure;

an eighth set of instructions, which when executed by the computer cause the computer to select a view set of records, wherein each record in said view set of records is identified in response to said sixth set of instructions and has been retrieved by said record management system in response to said query selected in response to said eighth set of instructions; and a ninth set of instructions, which when executed by the computer cause the computer to determine a measure result for a cell in said multi-dimensional view based on records in said view set of records.

24. The computer-readable medium of claim 23, wherein said sixth set of instructions includes:

a tenth set of instructions, which, when executed by the computer, cause the computer to take an intersection of said first group and said second group to identify records that are in both said first group and said second group.

25. The computer-readable medium of claim 23, wherein said seventh set of instructions includes:

an eleventh set of instructions, which when executed by the computer cause the computer to access a set of query map records, wherein each query map record in said set of query map records identifies a query from said set of queries, a set of dimensions called for by said query from said set of queries, and a set of measures called for by said query from said set of queries; and a twelfth set of instructions, which when executed by the computer cause the computer to select a query that is identified in said set of query map records by a query map record having contents that consist of an identifier for said query, each of said D dimensions, each of said B dimensions, and a set of measures including said measure.

26. The computer readable medium of claim 17, wherein said third set of instructions includes:

an eighteenth set of instructions, which when executed by the computer cause the computer to determine a two-pass value measure result for each combination of groups in said all combinations of groups based on said one-pass values determined in response to said second set of instructions.

27. The computer readable medium of claim 26, wherein said set of instructions further includes:

a nineteenth set of instructions, which when executed by the computer cause the computer to store all said two-pass value measure results determined in response to said eighteenth set of instructions.

28. The computer readable medium of claim 17, wherein said two-pass value measure result is a percentage, and wherein said third set of instructions includes:

a twentieth set of instructions, which when executed by the computer cause the computer to calculate said two-pass value measure result according to the following equation:

$$TPV = (OPV/\Sigma OPV)*100\%$$

wherein:

TPV is said two-pass value measure result;

OPV is a one-pass value determined in response to said second set of instructions; and $\Sigma OPV$ is a summation of all one-pass values determined in said step (b).

29. A record management system for determining a two-pass value measure result representing a measure in a multi-dimensional view containing cells, based on records in a computer readable medium, said record management system comprising:

a system bus;

a master table storage unit coupled to said system bus for maintaining said records;

a query map storage unit coupled to said system bus;

a master table index storage unit coupled to said system bus;

a layout mapping storage unit coupled to said system bus;

an index engine coupled to said system bus for generating a record structure foundation; and a layout engine coupled to said system bus, said layout engine including:

a means for identifying a set of cells in said multi-dimensional view, wherein said set of cells includes all cells needed for determining said two-pass value measure result;

a means for determining a one-pass value for each cell in said all cells; and a means for determining said two-pass value measure result based on said one-pass values determined by said means for determining a one-pass value.

30. The record management system of claim 29, wherein said means for identifying include:

a means for identifying a set of combinations of groups of said records, wherein said set of combinations includes all combinations of groups needed to determine said two-pass value measure result.

31. The record management system of claim 30, wherein said means for determining a one-pass value include:

a means for determining a one-pass value for each combination in said all combinations.

32. The record management system of claim 31, wherein said view characterizes two-pass value measure results by a set of D dimensions and a set of B dimensions, wherein each combination in said all combinations includes a group in a first set of groups of records and a group in a second set of groups of records, wherein each record in said first set and each record in said second set is maintained in said master table stage unit after being retrieved by said record management system in response to a query in a set of queries, and wherein D and B are integers, wherein said means for determining a one-pass value for each combination in said all combinations include:

a means for identifying records that are in a first group in said first set of groups and a second group in said second set of groups;

a means for selecting a query in said set of queries that calls for said D dimensions, said B dimensions, and said measure;

a means for selecting a view set of records, wherein each record in said view set of records is identified by said means for identifying records and has been retrieved by said record management system in response to said query selected by said means for selecting a query; and a means for determining a one-pass value based on records in said view set of records.

33. The record management system of claim 32, wherein said means for identifying records include:

a means for taking an intersection of said first group and said second group to identify records that are in both said first group and said second group.

34. The record management system of claim 32, wherein said means for selecting a query include:

a means for accessing a set of query map records, wherein each query map record in said set of query map records identifies a query from said set of queries, a set of dimensions called for by said query from said set of queries, and a set of measures called for by said query from said set of queries; and a means for selecting a query that is identified in said set of query map records by a query map record having contents that consist of an identifier for said query, each of said D dimensions, each of said B dimensions, and a set of measures including said measure.

35. The record management system of claim 30, wherein said means for identifying a set of combinations include:

a means for identifying a first placement axis node for an axis of said multi-dimensional view, wherein said first placement axis node corresponds to a first set of groups of records;

a means for identifying a second placement axis node for an axis of said multi-dimensional view, wherein said second placement axis node corresponds to a second set of groups of records, wherein each combination in said all combinations includes a group in said first set of groups and a group in said second set of groups.

36. The record management system of claim 35, wherein said means for identifying a first placement axis node include:

a means for selecting an axis node;

a means for determining whether said axis node is in a set of axis nodes corresponding to a placement dimension; and a means for determining whether said axis node corresponds to a group of records that corresponds to a cell in which said two-pass value measure result is to be displayed.

37. The record management system of claim 29, wherein said means for determining said two-pass value measure result include:

a means for determining a two-pass value measure result for each cell in said set of cells based on said one-pass values determined by said means for determining a one-pass value.

38. The record management system of claim 29, wherein said means for determining said two-pass value measure result includes:

a means for calculating said two-pass value measure result according to the following equation:

$$TPV=(OPV/\Sigma OPV)*100\%$$

wherein:

TPV is said two-pass value measure result;

OPV is a one-pass value determined by said means for determining a one-pass value; and $\Sigma OPV$ is a summation of all one-pass values determined by said means for determining a one-pass value.

* * * * *